United States Patent
Schneider

(10) Patent No.: US 11,899,252 B2
(45) Date of Patent: Feb. 13, 2024

(54) LIGHT PATH ALONG A CIRCULAR ARC AND TRANSMISSION OF A SIGNAL BETWEEN TWO UNITS ROTATING RELATIVE TO EACH OTHER

(71) Applicant: Fraunhofer-Gesellschaft zur Förderung der angewandten Forschung e.V., Munich (DE)

(72) Inventor: Tobias Schneider, Dresden (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 136 days.

(21) Appl. No.: 17/392,948

(22) Filed: Aug. 3, 2021

(65) Prior Publication Data

US 2022/0045763 A1 Feb. 10, 2022

(30) Foreign Application Priority Data

Aug. 6, 2020 (DE) .......................... 102020210010.1
Dec. 4, 2020 (DE) .......................... 102020215386.8

(51) Int. Cl.
*G02B 6/42* (2006.01)
(52) U.S. Cl.
CPC .................................. *G02B 6/4203* (2013.01)
(58) Field of Classification Search
CPC .. G02B 6/0048; G02B 6/3604; G02B 6/4203; G02B 6/4214
See application file for complete search history.

(56) References Cited

U.S. PATENT DOCUMENTS 4,109,997 A 8/1978 Iverson
4,259,584 A 3/1981 Krumme
(Continued)

FOREIGN PATENT DOCUMENTS

CN 105026830 A 11/2015
DE 2441359 A1 3/1976
(Continued)

OTHER PUBLICATIONS

Xiaorong Li, "Office Action for CN Application No. 202110904053.6", dated Sep. 14, 2022, CNIPA, China.
(Continued)

*Primary Examiner* — Omar R Rojas
(74) *Attorney, Agent, or Firm* — Bridgeway IP Law Group, PLLC; Jihun Kim

(57) ABSTRACT

An optical device has a light path for guiding a light beam along a circular arc. The light path has at least one light path segment having a number of light path elements arranged tangentially along the light path. Each of the light path elements is at least partially limited in a radial direction by a first interface. The first interfaces of a respective light path segment are each configured to reflect at least light incident from the light path at an angle of incidence greater than a predetermined angle onto the respective first interface to keep a light beam propagating along the light path in a direction of travel predetermined for the respective light path segment on the light path. A first tangential end of the first interfaces is spaced radially further apart from the center of the circular arc than a second tangential end.

22 Claims, 21 Drawing Sheets

(56) References Cited

U.S. PATENT DOCUMENTS

| | | | |
|---|---|---|---|
| 4,711,516 A | 12/1987 | Graber | |
| 7,248,761 B2 * | 7/2007 | Schilling | G02B 6/34 385/9 |
| 7,702,375 B2 | 4/2010 | Boeninger et al. | |
| 8,374,506 B2 | 2/2013 | Stark | |
| 10,326,561 B2 * | 6/2019 | Dudek | H02K 1/22 |
| 10,466,077 B2 | 11/2019 | Okamoto | |
| 2004/0062344 A1 | 4/2004 | Wolf-Ekkehard et al. | |
| 2005/0063709 A1 | 3/2005 | Poisel et al. | |
| 2010/0202782 A1 | 8/2010 | Stark | |
| 2016/0003451 A1 | 1/2016 | Beijer et al. | |
| 2018/0299678 A1 | 10/2018 | Degen et al. | |

FOREIGN PATENT DOCUMENTS

| | | | |
|---|---|---|---|
| DE | 2846526 A1 | 5/1980 |
| DE | 102007041927 A1 | 3/2009 |
| DE | 102008021290 A1 | 11/2009 |
| DE | 102015122055 A1 | 6/2017 |
| DE | 102017106441 A1 | 9/2018 |
| DE | 102017217110 A1 | 3/2019 |
| EP | 2876471 A1 | 5/2015 |
| WO | 2005/015788 A1 | 2/2005 |

OTHER PUBLICATIONS

Den Haag, "European Search Report for EP Application No. 21 18 9153", dated Dec. 20, 2021, EPO, Germany.

\* cited by examiner

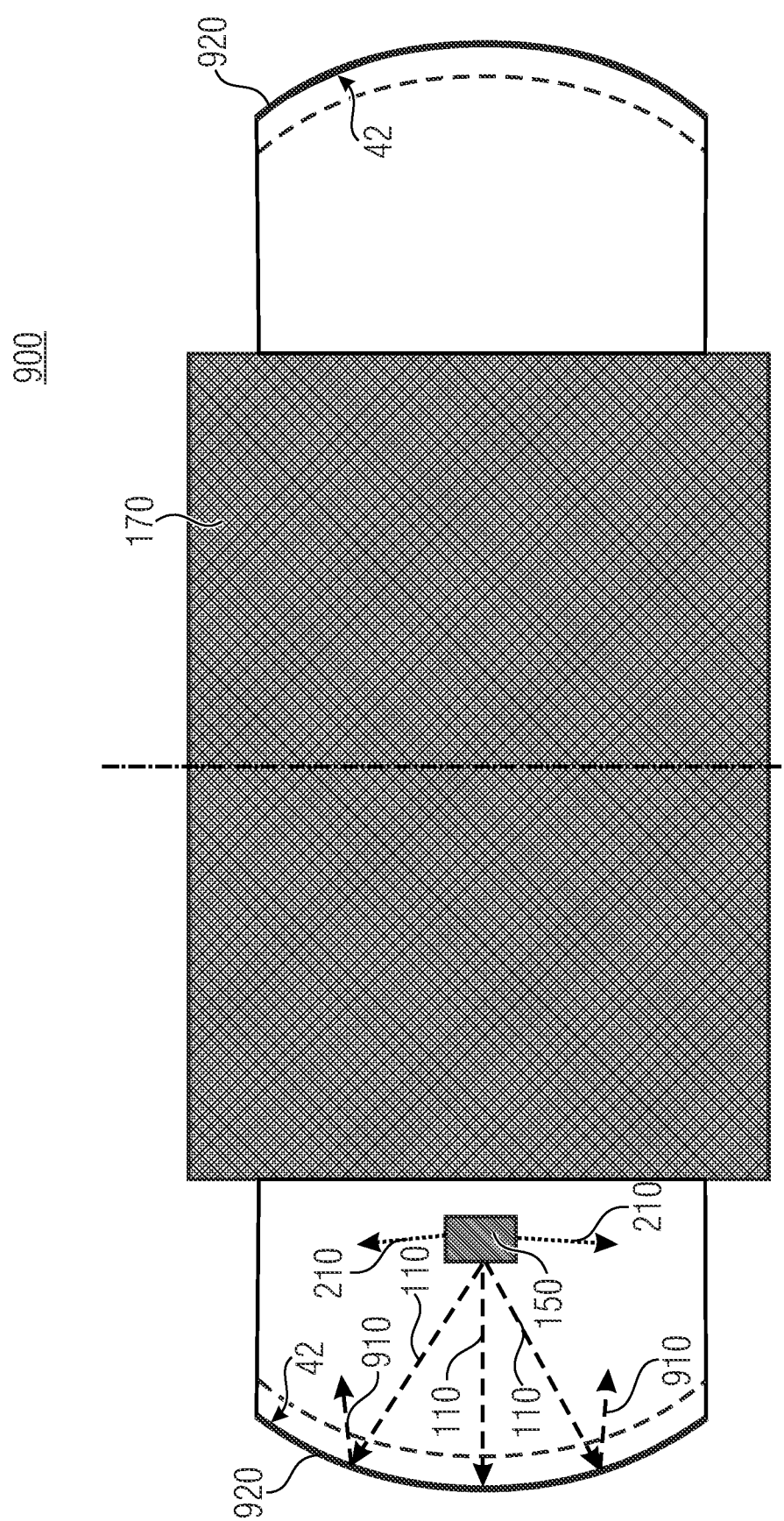

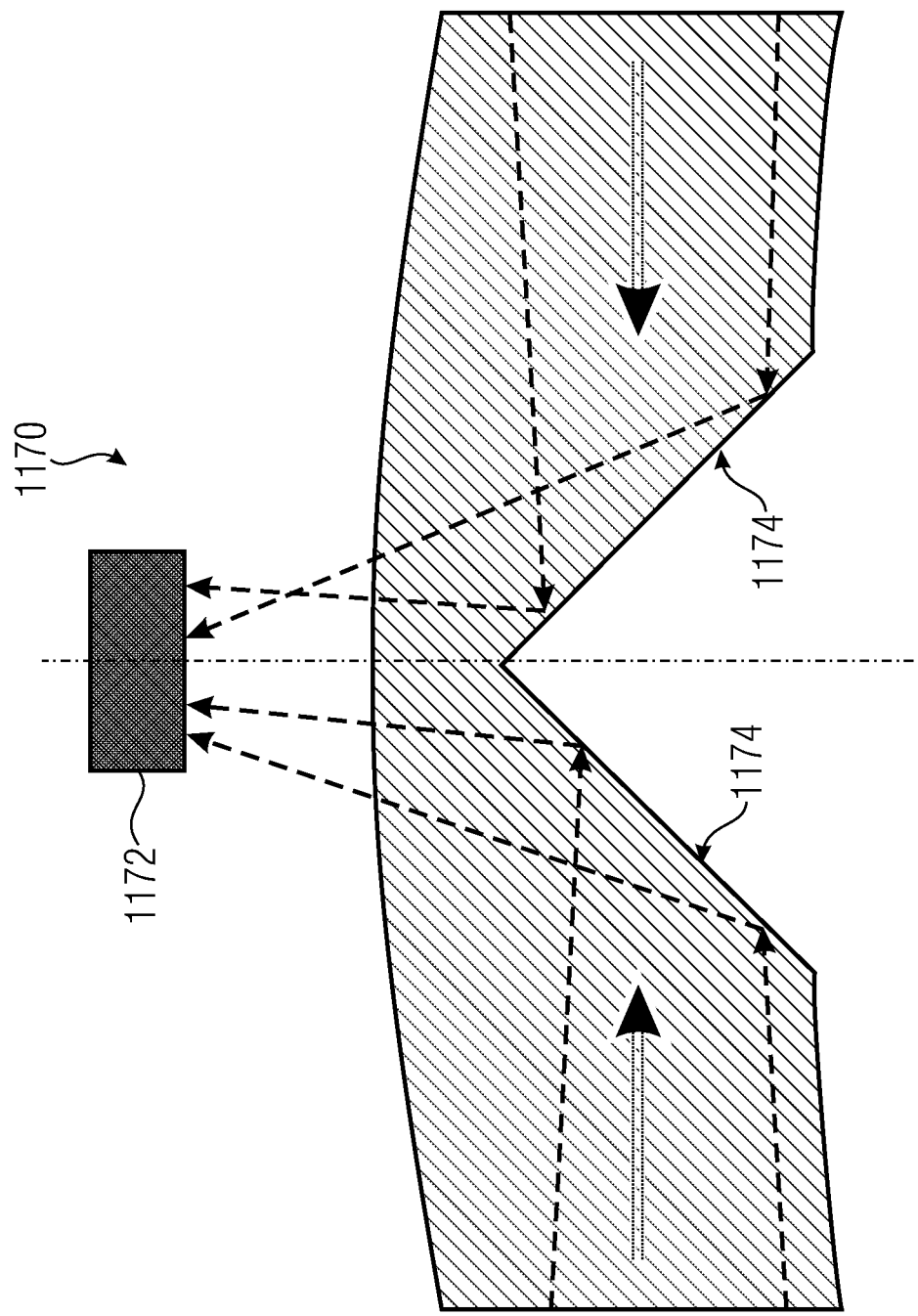

LIGHT PATH ALONG A CIRCULAR ARC AND TRANSMISSION OF A SIGNAL BETWEEN TWO UNITS ROTATING RELATIVE TO EACH OTHER

CROSS-REFERENCE TO RELATED APPLICATIONS

This application claims priority from German Patent Application No. 102020215386.8, which was filed on Dec. 4, 2020, and is incorporated herein in its entirety by reference.

Examples of the present disclosure relate to an optical device having a light path for guiding a light beam along a circular arc. Further examples of the present disclosure relate to a method for transmitting a signal between two units rotating relative to each other using the optical device.

Some examples of the present disclosure relate to an optical wireless transceiver rotating about an axis of rotation and/or an optical wireless transceiver for data transmission in 360° rotation outside of a free axis of rotation.

BACKGROUND OF THE INVENTION

The invention deals with the problem of enabling data transmission via two members rotating relative to each other. This is not possible or only possible to a very limited extent with cables. In addition, the axis of rotation has to often remain free due to the application.

This is needed, for example, for computer tomographs or motors. Here, special attention is paid to achieving the highest possible transmission bandwidth (>=1 Gbps).

Current industrial systems are based on data transmission by means of electrical cables. Slip rings and contact brushes are used at the rotation points. Due to the wear of the contacts, these systems have a limited lifetime. Further, HF-based waveguide systems are used, where an HF-based signal is guided in a waveguide. Occasionally, there are also that use optical data transmission.

Multipath propagation occurs due to the all-round signal propagation of the electrical signal/HF radio signal on the slip ring and in the waveguide. This results in considerable run time differences and a limitation of the transmission bandwidth. Systems commonly available on the market allow data rates in the range of about 100 Mbit/s. Patent DE 10 2007 041 927 A1 also deals with this problem and aims to solve it by adapting optical waveguides, ideally single-mode fibers, with a core diameter of 10 µm. The thin fibers are adapted in such a way that, in addition to coupling in/out at the front face, light can also be coupled in or out laterally. This approach is based on the wave character of light. Another patent (DE 28 46 526 A1) describes a basic device for optical data transmission in a computer tomograph. The same applies to U.S. Pat. No. 4,109,997, where data rates of 1 Mbit/s to 30 Mbit/s are targeted. Another patent US 2004/0062344 A1 forms a metallic reflective waveguide in a ball-bearing stator-rotor system for transmitting data therein.

SUMMARY

An embodiment provides an optical device including a light path for guiding a light beam along an arc, wherein the light path includes at least one light path segment including a number of light path elements arranged tangentially along the light path, each of the light path elements being at least partially limited in a radial direction by a first interface, wherein the first interfaces of a respective light path segment are each configured to reflect at least light incident from the light path at an angle of incidence greater than a predetermined angle onto the respective first interface to keep a light beam propagating along the light path in a direction of travel predetermined for the respective light path segment on the light path; and wherein a first tangential end of the first interfaces is spaced radially further apart from the center of the circle of the circular arc than a second tangential end.

According to another embodiment, a method for transmitting a signal between two units rotating relative to each other using an inventive optical device may have the following steps: emitting at least one light beam, which signals the signal, coupling at least one of the at least one light beams into one of the at least one light path segments such that the coupled light beam propagates in the predetermined direction of travel of the light path segment, detecting the coupled-in light beam that has propagated in the predetermined direction of travel by means of receiving means arranged stationary with respect to the light path.

One idea of the present disclosure is to configure an interface of a light path describing a circular arc at least partially such that a light beam having a tangential component along the circular arc can be coupled into the light path. This can be obtained by at least first interfaces of light path elements of the light path being oriented such that their orientation, averaged over the respective first interface, is tilted compared to a tangential orientation. This results in a preferred direction for light beams whose tangential component has a predetermined direction. By arranging the light path elements along the light path, a predetermined direction of travel for a respective light path segment of the light path can be provided. Due to the configuration of the first interfaces, light passing through the light path along the predetermined direction of travel is thus kept on the light path, whereas propagation of light against the predetermined direction of travel is suppressed. If the tangential position where light is coupled into the light path changes continuously, it can be achieved on the basis of the predetermined direction of travel of the light path that light impinges on a specific position, for example an end, of the light path in the same time sequence in which it was coupled into the light path. This enables high data rates. In addition, the configuration of the first interfaces ensures a very efficient coupling of light beams into the light path, since a light beam traversing the light path in the predetermined direction of travel can be reflected such that an angle with respect to the tangential direction is reduced due to the tilting of the first interfaces when reflected at one of the first interfaces. In some examples, this enables total reflection. In further examples, this may reduce the light path in the radial direction such that, for example, a free space inside the light path may be increased.

Examples of the present disclosure provide an optical device having a light path for guiding a light beam along a circular arc. The light path includes at least one light path segment comprising a number of light path elements arranged tangentially along the light path. Each of the light path elements is at least partially limited in a radial direction by a first interface. The first interfaces of a respective light path segment are each configured to reflect at least light incident from the light path at an angle of incidence greater than a predetermined angle onto the respective first interface to keep a light beam propagating along the light path in a direction of travel predetermined for the respective light path segment. A first tangential end of the first interfaces is spaced radially further apart from the center of the arc than a second tangential end.

By such an arrangement of the tangential ends of the first interfaces, it is obtained that the orientation of the first interfaces is tilted compared to an orientation parallel to the tangential direction. As a result, a preferred direction for the reflection of light beams at the first interfaces can be created with respect to the tangential direction. By the preferred direction for reflection, the predetermined direction of travel of the respective light path segment can be obtained, so that multipath propagation of light in different directions can be suppressed.

The presented solution may differ significantly from patent application DE102017217110 A1. Unlike DE 10 2007 041 927 A1, the idea is based on ray optics. In contrast to DE 28 46 526 A1, US 2004/0062344 A1, U.S. Pat. No. 4,109, 997 A, however, data rates in the range of $>10^9$ bit/s are possible. This can be achieved by ordered beam guidance in the optical fiber structure for effectively preventing multipath propagation. The approach of the present disclosure is based on classical ray optics. In contrast to solutions known in conventional technology, in which it is assumed that the structures used have no special shape and therefore the beams propagate more or less chaotically through the optical fiber, examples of the present disclosure can enable ordered beam guidance along a light path. Further, by arranging interfaces of the light path according to examples of the present disclosure, multipath propagation of light beams on the light path can be suppressed. As a result, increased data rates may be enabled.

In examples, each of the first interfaces of a respective light path segment is configured such that, for each point of the first interfaces, a surface normal is rotated with respect to a connecting line between the respective point of the first interfaces and the center of the circle of the circular arc within the circular plane of the circular arc in a direction of rotation predetermined for the respective light path segment. Compared to a surface whose surface normal is not rotated with respect to the connecting line, the angle of incidence of a light beam having a tangential component in the direction of the predetermined direction of travel is reduced at each point of the first interfaces. Thus, this configuration of the first interfaces allows the preferred direction for propagation of light in the light path segment to be particularly pronounced. In examples, the coupling efficiency is also increased.

In examples, a respective intersection of the first interfaces in the circular plane of the circular arc is convex or planar with respect to the center of the circle. A convex configuration makes it possible to keep a light beam particularly well on a circular arc-shaped light path. Thus, a radial expansion of the light path can be reduced. Alternatively, a number of light path elements can be kept low, making the optical device easier to implement. A planar configuration of the interfaces can be implemented at very low cost, and can allow light to be directed along the light path, for example, in combination with a high number of light path elements and/or a larger radial expansion of the light path.

In examples, an intersection of each of the first interfaces in the circular plane of the arc of the light path describes a circular arc, which is referred to as the interface circular arc. A circular arc-shaped configuration of the first interfaces allows light beams to be kept very precisely on the circular arc-shaped light path.

In examples, the at least one light path segment includes at least a first light path segment and a second light path segment. The respective directions of travel predetermined for the first light path segment and the second light path segment are opposite. Each of the two light path segments may comprise, for example, half of the light path. By combining two light path segments with opposite predetermined directions of travel, a runtime jump can be avoided. A runtime jump can occur, for example, if a transmitting unit, which transmits an optical signal that is to be coupled into the light path in the form of a light beam, rotates past a position of the light path where the optical signal is to be detected in the form of the coupled-in light beam. Advantageously, the combination of two light path segments is combined with the fact that a transmitting unit, which is arranged on a circular path concentric to the light path and rotatable relative to the light path, combines the optical signal in the form of two light beams, which have tangential members opposite to each other. By combining two light path segments with opposite predetermined directions of travel, it can thus be made possible that the runtime varies continuously with the position of the transmitting unit from the coupling of a light beam to a point where the coupled light is to be detected. By avoiding the runtime jump, very high data rates are enabled.

In examples, the optical device further comprises receiving means arranged stationary with respect to the light path. The receiving means are configured to detect light that passes through, or has passed through, one of the at least one light path segments in the predetermined direction of travel of the respective light path segment. Thus, light that is coupled into the light path in the predetermined direction of travel can be detected. Since the at least one light path segment may allow coupling of light along its full circumference, light emitted at different or arbitrary tangential positions may thus be detected. This can reliably enable transmission of a signal between two members rotating relative to each other, for example, regardless of a relative angle of rotation between the two members.

In examples, the first interfaces limit the light path radially outward, and are configured as mirrors for light from the light path to reflect light incident from the light path onto the respective first interface. Mirrors can enable a high degree of reflection. Thus, the arrangement of the first interfaces as outer limits can largely prevent light from leaving the light path to the outside. Thus, the optical power is kept inside the light path.

In examples, the first interfaces are configured in a convex manner along the axial direction of the circular arc with respect to the center of the circle of the circular arc. The first interfaces can thus have a focusing effect with respect to the axial direction. Thus, light beams that have a directional component along an axial direction are reflected in the direction of the circular plane when reflected from one of the first interfaces, so that light beams can be precisely held on the light path.

In examples, the light path elements are formed by one or several optical fibers. Each of the light path elements is at least partially limited radially inward and outward by a respective different one of a first interface and a second interface. The second interfaces of the light path elements are each configured to reflect light incident from the light path at an angle of incidence greater than a critical angle of the respective second interface onto the respective second interface to keep a light beam propagating along the light path in a predetermined direction of travel for the respective light path segment on the light path. The light path elements are wedge-shaped and have a greater expansion in the radial direction at a first tangential end than at a second tangential end. Light guides are capable of guiding light beams with particularly low loss, even on a curved light path, since total reflection occurs when a light beam is incident on an interface of the optical fiber at an angle of incidence greater than the critical angle. The use of optical fibers is particularly advantageous in connection with the configuration of the first interfaces, since this allows a light beam which is refracted into the optical fiber from outside the optical fiber, i.e. from outside the light path, to be reflected by means of total reflection at an interface of the optical fiber opposite to the entrance surface. The entrance surface may be, for example, the first interface or an interface of the optical fiber opposite to the first interface. The configuration of the first interfaces as interfaces of an optical fiber element thus enables an overall efficient coupling and transmission of light by means of the light path.

In examples, the first interfaces limit the light path segments radially outward, and the second interfaces limit the light path segments radially inward. The second interfaces are configured in accordance with the first interfaces, i.e., the second interfaces may have the features of the first interfaces described herein, in particular their configuration and shape. The fact that the second interfaces are configured in accordance with the first interfaces is not intended to mean that the first interfaces are necessarily identical to the second interfaces, but that the features characterizing the first interfaces also apply to the second interfaces. The first tangential end of the first interfaces of a respective light path segment is arranged opposite the second tangential end of the second interfaces of the respective light path segment in the radial direction. Because both the first interfaces and second interfaces are tilted with respect to a tangential orientation, a particularly strong wedge shape can be achieved, that is, the angle between two opposite ones of the first and second interfaces can be particularly large. Thus, the preferred direction can be particularly strong and an angular range in which coupling of light into the light path can be achieved can be particularly large.

In examples, the first interfaces limit the light path segments radially outward, and the second interfaces limit the light path segments radially inward. The second interfaces are configured in accordance with the first interfaces, as described above. For the first interfaces of a respective light path segment, the direction of travel from the first tangential end along the respective first interface to the second tangential end is opposite to the direction of travel predetermined for the respective light path segment. For the second interfaces of a respective light path segment, the direction of travel from the first tangential end along the respective second interface to the second tangential end corresponds to the direction of travel predetermined for the respective light path segment. This configuration has the advantages of the preceding example, and additionally allows for a more flexible implementation or configuration of the light path segments.

In examples, the first and second interfaces are arranged offset from each other in a direction tangential to the light path. Such an arrangement can improve the coupling efficiency for light to be coupled into the optical fiber from outside the light path, compared to a configuration in which one of each of the first and second interfaces are arranged opposite to each other.

In examples, the second interfaces of a respective light path segment together form a circular arc around the center of the circle of the light path. With this configuration of the light path segments, the interface of the light path segment, which is formed by the second interfaces, is particularly easy to produce.

In examples, the interfaces limiting the light path elements radially outward are configured in a convex manner along the axial direction of the circular arc with respect to the center of the circle of the circular arc. Further, the interfaces limiting the light path elements radially inward are configured in a concave manner along the axial direction of the circular arc with respect to the center of the circle of the circular arc. The first and second interfaces can thus have a focusing effect with respect to the axial direction. Thus, light beams having a directional component along an axial direction are reflected in the direction of the circular plane when reflected from one of the first or second interfaces, so that light beams can be precisely held on the light path. Thus, the light path segments have a high tolerance to the angle of incidence with respect to the circular plane of a light beam to be coupled into the light path. Thus, the angle of incidence can be increased.

In examples, a wedge angle between a respective one of the first interfaces and a respective one of the second interfaces is in a range between 1° and 10° or in a range between 2° and 6°. The wedge angle is the sum of a first angle of the respective first interface and a second angle of the respective second interface. The first angle is the smallest angle between the line connecting the first tangential end and the second tangential end of the respective first interface and the tangent to the circular arc of the light path at a point centered in tangential direction between the first tangential end and the second tangential end of the respective first interface. The second angle is the smallest angle between the line connecting the first tangential end and the second tangential end of the respective second interface and the tangent to the circular arc of the light path at a point centered in tangential direction between the first tangential end and the second tangential end of the respective second interface. If the wedge angle is in this range, light can be coupled into the light path in a particularly efficient manner. If the wedge angle is in this range, the angle of incidence can be selected such that low losses occur at the entrance interface and, at the same time, total reflection of the light beam refracted into the optical fiber element at the opposite interface is possible. Losses at the entrance interface can occur, for example, due to back reflection or Fresnel losses, so that a large part of the optical power is refracted into the optical fiber at the entrance interface.

In examples, the optical device comprises at least one transmitting unit. The at least one transmitting unit and the light path are arranged such that the at least one transmitting unit is rotatable relative to the light path on a circular path concentric to the light path. The at least one transmitting unit is configured to emit at least one light beam, which signals a signal, in the direction of the circular path of the light path. By combining the transmitting unit with the light path of the optical device, an uninterrupted transmission of a signal between two rotating members can be enabled.

In examples, the optical device further comprises at least one transmitting unit, wherein the at least one transmitting unit and the light path are arranged such that the at least one transmitting unit is rotatable relative to the light path on a circular path concentric to the light path. Thereby, the radius of the concentric circular path is smaller than the radius of the circular arc of the light path. The at least one transmitting unit is configured to emit at least one light beam, which signals a signal, in the direction of the circular path of the light path. Because the concentric circular path is smaller than the radius of the arc of the light path, this arrangement is particularly well suited for coupling light into the light path if the second interfaces are formed by mirrors.

In examples, the optical device further comprises at least one transmitting unit, wherein the at least one transmitting unit and the light path are arranged such that the at least one transmitting unit is rotatable relative to the light path along a circular path concentric to the light path. The radius of the concentric circular path smaller or larger than the radius of the circular arc of the light path. This transmitting unit is configured to emit at least one light beam, which signals a signal, in the direction of the circular path of the light path. The radiation direction of the at least one light beam is selected such that the at least one light beam is coupled into the light path by refraction when incident on one of the first interfaces or the second interfaces of one of the at least one light path segments.

In examples, the radiation direction of the at least one light beam is selected such that the angle of incidence of the at least one light beam when incident on one of the first or second interfaces is less than 80°, or less than 75°, or in a range between 60° and 80°, or in a range between 65° and 75°. In a range of less than 80° or less than 75°, particularly low Fresnel losses occur. In a range of more than 60° or more than 65°, the coupled light beam can have an angle of incidence with respect to an opposite interface that allows total reflection. This means that a particularly large amount of optical power can be coupled into the light path.

In examples, the at least one light path segment includes a first light path segment and a second light path segment. The predetermined direction of travel of the first light path segment is opposite to that of the second light path segment. Further, the optical device comprises at least one transmitting unit. The light path and the at least one transmitting unit are arranged such that the at least one transmitting unit is rotatable relative to the light path on a circular path concentric to the light path. The at least one transmitting unit is configured to emit a first light beam and a second light beam in the direction of the circular path of the light path. A tangential component of the directional vector of the first light beam points in the predetermined direction of travel of the first light path segment, and a tangential component of the directional vector of the second light beam points in the predetermined direction of travel of the second light path segment. Thus, depending on the position relative to the light path at which the transmitting unit is located, either the first light beam can be coupled into the first light path segment, or the second light beam can be coupled into the second light path segment. Thus, uninterrupted signal transmission between the transmitting unit and the light path is possible, independent of their relative rotational position to each other.

In examples, the light path comprises an n-th fraction of an entire circle, and the at least one transmitting unit includes a number of n transmitting units that are equally distributed along the concentric circular path. Thus, the light path can be made very compact, and at the same time signal transmission along a whole circle of 360° can be achieved.

Examples of the present disclosure provide a method for transmitting a signal between two units rotating relative to each other using the optical device according to the above-described examples. The method includes emitting at least one light beam, which signals the signal. Further, the method includes coupling at least one of the at least one light beams into one of the at least one light path segments such that the coupled light beam propagates in the predetermined direction of travel of the light path segment. Further, the method includes detecting the coupled-in light beam that has propagated in the predetermined direction of travel by means of receiving means arranged stationary with respect to the light path.

BRIEF DESCRIPTION OF THE DRAWINGS

Embodiments of the present invention will be detailed subsequently referring to the appended drawings, in which:

FIG. 10 is a sectional view of an optical device with mirror elements according to an example of the present disclosure, FIG. 11A-D are schematic illustrations of receiving means according to examples of the present disclosure.

DETAILED DESCRIPTION OF THE INVENTION

Examples of the present disclosure are described in detail below, using the attached figures. In the following description, many details are described to provide a more thorough explanation of examples of the disclosure. However, it will be apparent to those skilled in the art that other examples may be implemented without these specific details. Features of the various examples described may be combined with each other unless features of a corresponding combination are mutually exclusive or such combination is explicitly excluded.

It should be noted that the same or similar elements or elements having the same functionality may have the same or similar reference numbers or can be designated in the same way, and a repeated description of elements having the same or similar reference number or being designated in the same way is typically omitted. Descriptions of elements having the same or similar reference signs or being designated in the same way are interchangeable.

Figure 1:
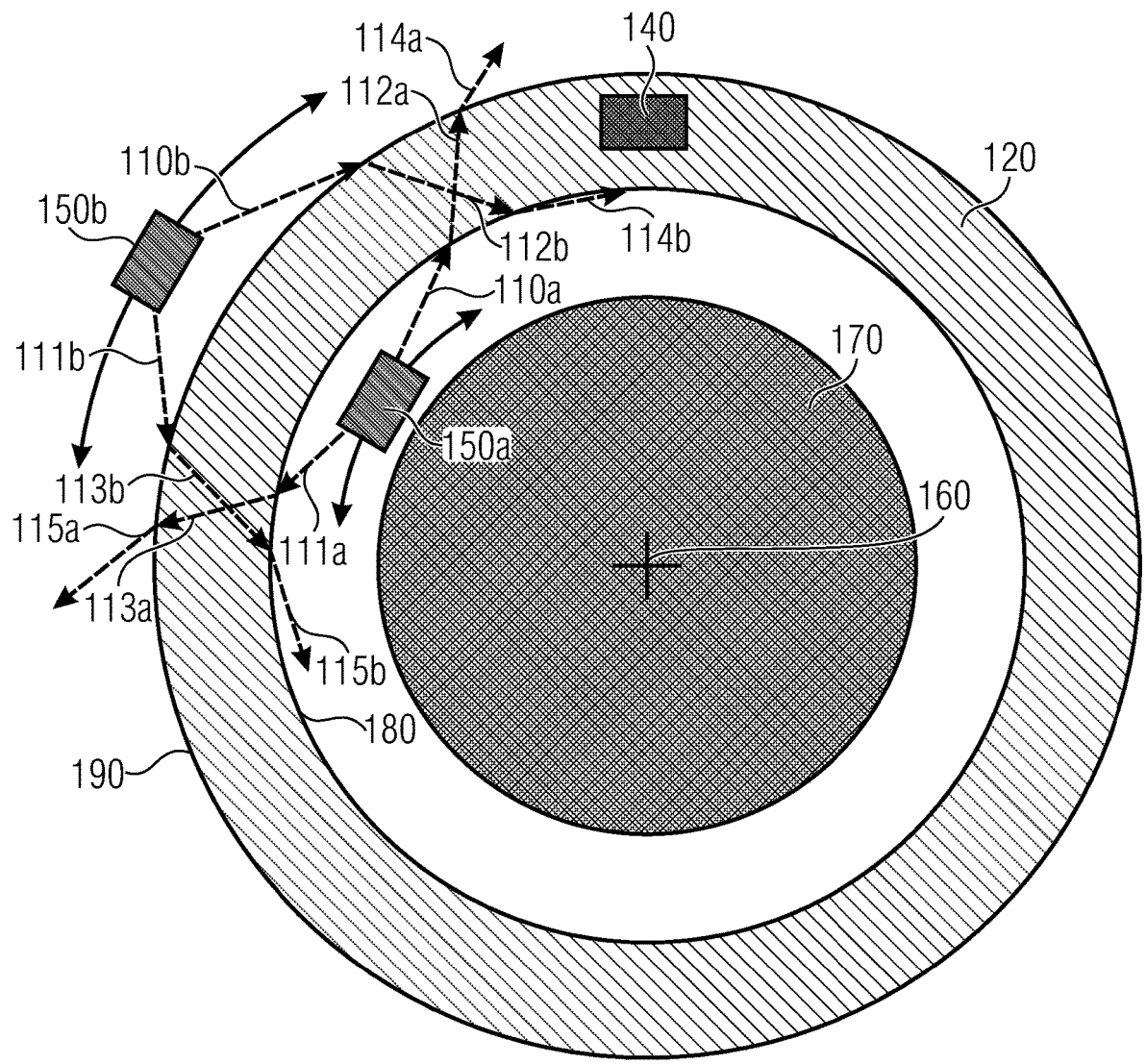
FIG. 1 is a top view of an ideal optical fiber with lateral light irradiation.

FIG. 1 shows a schematic diagram in top view of an example of an optical data link 100. The optical data link 100 comprises a transmitting unit 150 and a receiving unit 140. The data link may use a communication wavelength in the infrared, visible or ultraviolet spectral range. This spectral range is referred to below in simplified terms as "light". Both are located adjacent to the rotation axis 160 and move in a circular path around this rotation axis 160.

Permanent data communication is not possible without the proposed invention, since the transmitting unit and the receiving unit are directly opposite each other only in one position. Embodiments of the solution idea describe an optical fiber structure 120, which enables the optical connection between the transmitter and receiver to be made permanent. In this regard, the light guiding structure 120 may be associated with the receiving unit 140 and may transmit the light emitted by the transmitting unit to the receiving unit, regardless of its position on the circular path around the axis of rotation.

One embodiment of the inventive idea is the optical fiber structure and is derived from guiding of light in a mathematical torus. Light moving tangentially in an optical medium shaped like a torus is guided therein almost without loss by total reflection. This structure can therefore represent an ideal optical fiber structure 120. A receiving unit 140 may then be arranged at a position of this torus, which receives light and thus the optical signal. For example, this is provided by a corresponding decoupling structure. However, in order to transmit data, the optical signal has to be reliably coupled into the optical fiber structure in every position of a 360° rotation.

The system shown in FIG. 1 has an optical fiber structure in the form of a torus. Two exemplary transmitter positions 150a, 150b are shown. Here, transmission takes place exemplarily once from radially outside 150b and once from radially inside 150a. The transmitting beams 110a, 110b, 111a, 111b are incident on the optical fiber structure 120 at a very large angle. The beams 112a, 112b, 113a, 113b are then refracted into the torus so that they are incident on the respective opposite second interface at a much more acute angle. In contrast to the schematic drawing, the two concentric interfaces 180, 190 act on the incident light like a plane-parallel plate, since the radii in a real system are significantly larger and the thicknesses of such a torus relative to the radius are significantly smaller. This means that the incident light leaves the torus at the same angle at which it was incident on the torus. Thus, no light can be coupled into the optical fiber, since no total reflection takes place due to the acute angle. The light leaves the ring structure again.

Figure 2:
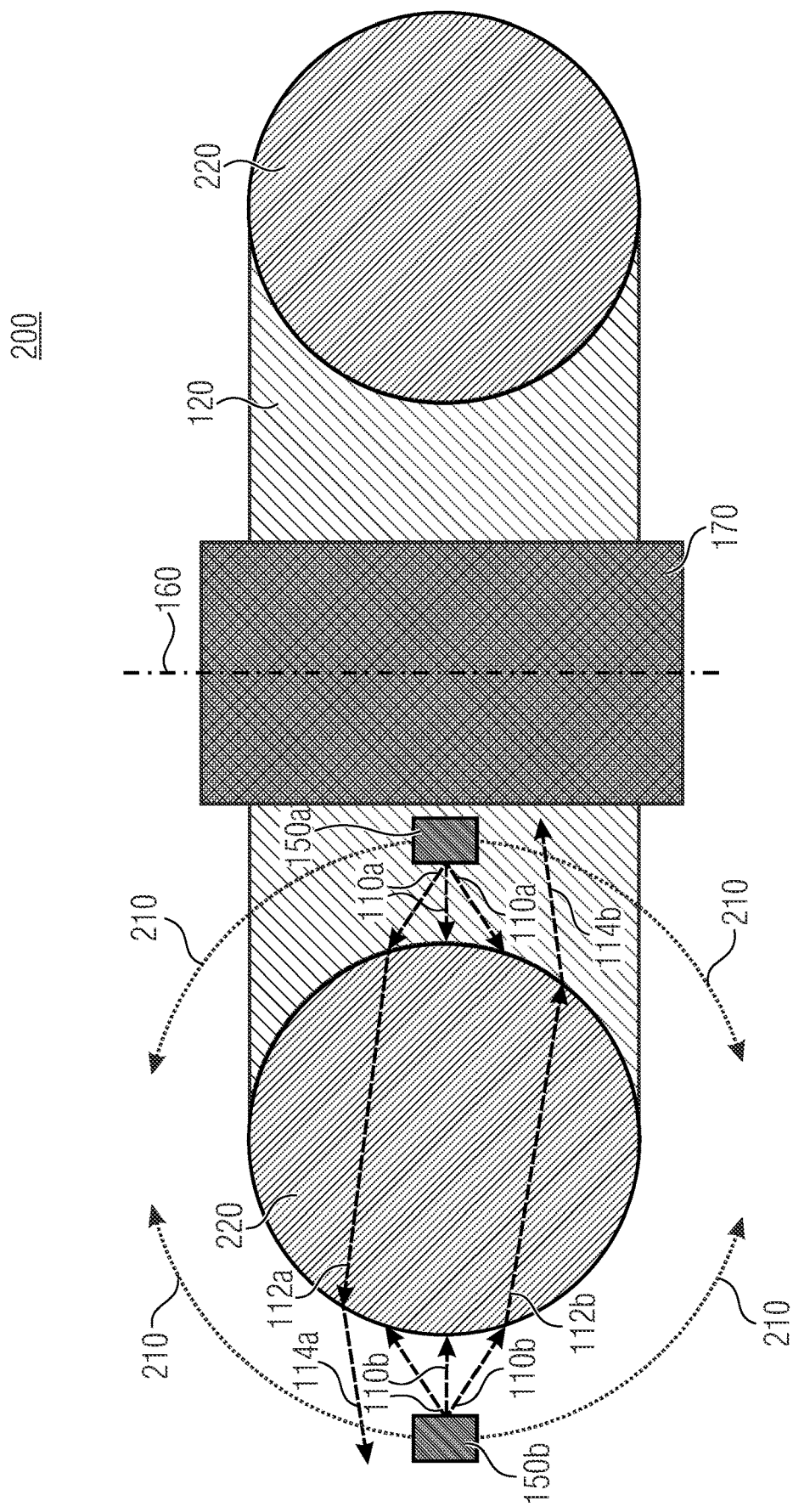
FIG. 2 is a sectional view of an ideal optical fiber with lateral light irradiation.

FIG. 2 shows a cross-section along a radial direction of the optical data link shown in FIG. 1. As illustrated in FIG. 2, even additional oblique irradiation with respect to the cross-section of the torus is not sufficient to couple the light based on total reflection. Input beams 110a, 110b are refracted into the torus, shown by the cross-sectional area 220. The coupled-in beams 112a, 112b are incident on the respective opposite interface 180, 190 and exit the optical fiber 120. Transmitters 150a, 150b can be arranged 360° around the cross-section, the area circled by the four dotted arrows 210 in FIG. 2.

Examples of the present disclosure provide for adapting the optical fiber structure to enable lateral coupling. In further examples, the core idea can also be implemented without optical fibers, for example with mirror elements.

Figure 14:
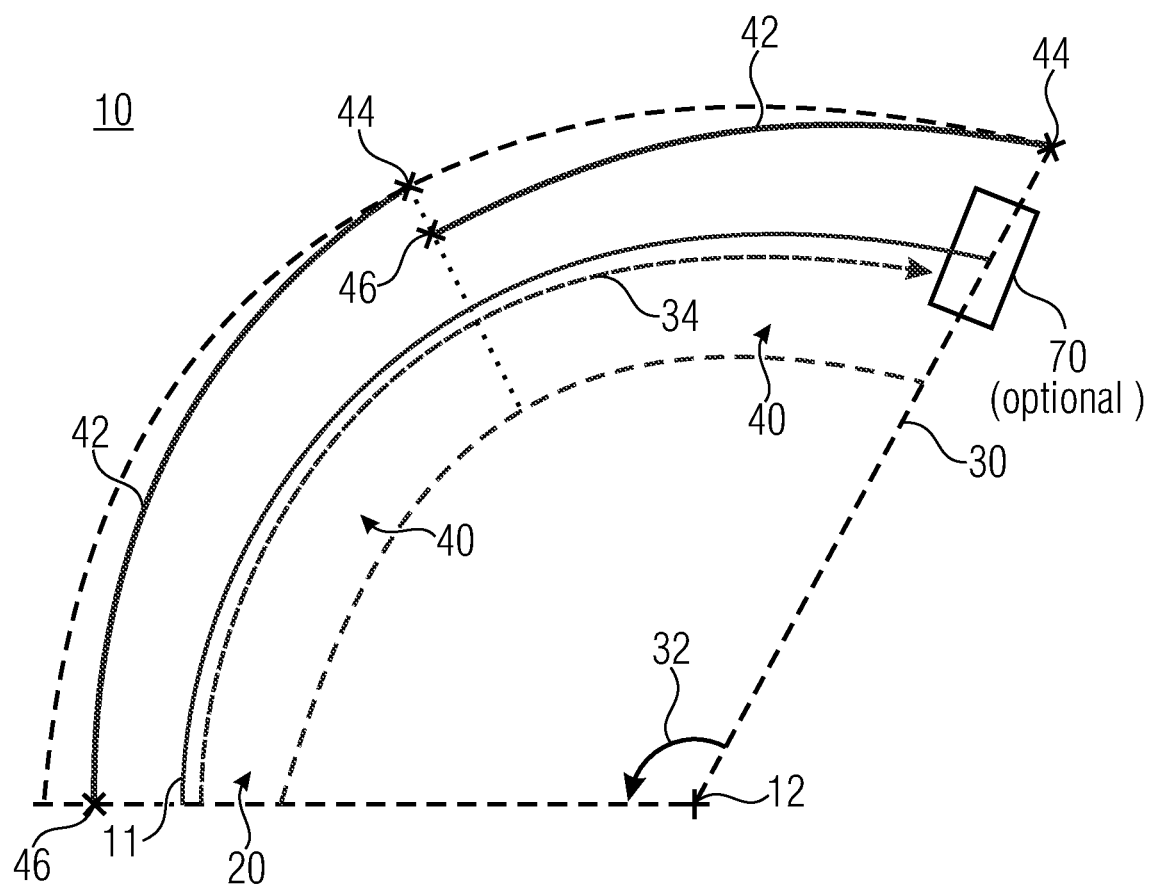
FIG. 14 is a schematic illustration of an optical device according to an example of the present disclosure.

FIG. 14 shows a schematic illustration of an optical device 10 according to an example of the present disclosure. The optical device 10 comprises a light path 20 for guiding a light beam along a circular arc 11. The light path 20 comprises at least one light path segment comprising a number of light path elements 40 arranged tangentially along the light path A radial direction is a direction in the circular plane of the circular arc 11 passing through the center of the circle 12 of the circular arc 11, whereas a tangential direction denotes a direction perpendicular to a radial direction. Each of the light path elements 40 is at least partially limited in a radial direction by a first interface 42. The first interfaces 42 of a respective light path segment 40 are each configured to reflect at least light incident from the light path 20 at an angle of incidence greater than a predetermined angle onto the respective first interface, so as to keep a light beam propagating along the light path in a direction of travel predetermined for the respective light path segment. A first tangential end 44 of the first interface 42 is spaced radially further apart from the center of the circle 12 of the circular arc 11 than a second tangential end 46 of the first interface 42. A tangential direction may also be referred to as an azimuthal direction. A tangential end may be understood to mean an end with respect to a tangential direction. Here, the first tangential end refers to the end in a first tangential direction, and the second tangential end refers to the end in the second tangential direction opposite to the first tangential direction.

The first interfaces 42 may be understood as interfaces between different materials, one of which may be air, for example. In this regard, in examples, the light path 20 may be in air, and the first interfaces 42 may represent interfaces to an optically denser material, such as metal, such that light incident from the light path on the first interfaces is reflected. In further examples, the light path 20 may be formed at least in part by a solid transparent to the light of the light beam, for example an optical fiber, and the first interfaces 42 may represent interfaces to an optically less dense material, for example air, so that light incident onto one of the first interfaces 42 from the light path 20 at an angle of incidence greater than the critical angle of the first interfaces 42 is reflected by means of total reflection. Here, the critical angle is defined by the optical density or refractive index of the two materials forming the first interfaces 42. Thus, the predetermined angle may refer to the critical angle of the respective first interface 42.

Where reference is made to an angle of incidence, it usually means the angle between the incident light beam and the incident perpendicular, i.e. the normal to the interface at the point of incidence.

Thus, in examples of the optical device 10, the light path 20 may extend through an optical fiber structure whose interfaces include the first and second interfaces of the light path.

Examples of the optical devices 10 may thus be similar to the optical device 100, 200 shown in FIGS. 1 and 2, wherein the optical fiber structure 120 is implemented according to the invention as with respect to FIG. 14.

In the example shown in FIG. 14, the circular arc 11 described by the light path 20 comprises a circular arc angle 32 of 120°. In further examples, the light path 20 comprises a smaller or larger angular range, e.g. a complete circle.

Further, in the example shown in FIG. 14, the light path 20 includes at least one light path segment 30. For the first interfaces 42 of a respective light path segment 30, a direction along the light path 20 along which to travel from the first tangential end 44 along the respective first interface 42 to the second tangential end 46 may be uniform. In other words, the first interfaces 42 of a respective light path segment 30 may be tilted or inclined in the same direction with respect to the tangential directions at the positions of the respective first interfaces 42. Thus, for light within a respective light path segment 30, the predetermined direction of travel of the respective light path segment 30 may be achieved.

By having the first tangential end 44 spaced radially further apart from the center of the circle 12 than the second tangential end 46, an averaged orientation of the first interface 42 with respect to the tangent to the circular arc 11 may be rotated at the position (for example, a midpoint in the tangential direction) of the first interface 42. Thus, compared to an interface whose average orientation with respect to the tangent is not rotated, a light beam incident on the first interface 42 is reflected either more or less strongly in the tangential direction depending on the direction of the tangential component of the light beam. Thus, depending on the orientation of the first interfaces 42, a preferred direction, the predetermined direction of travel 34, for propagation of a light beam along the light path within a respective light path segment 30 is provided. Thus, light traveling along the light path 20 in the predetermined direction of travel 34 is kept on the light path 20. In contrast, light travelling on the light path in the opposite direction to the predetermined direction of travel may be suppressed in its propagation on the light path 20, for example by being directed out of the light path 20. By the fact that the respective light path segment 30 has a predetermined direction of travel 34, and thus an occurrence of different directions of travel is suppressed, occurrence of an optical signal at several different times, which is coupled into the light path 20 in the form of a light beam at a position at which the optical signal is to be read out, can be prevented.

Further, the orientation of the first interfaces 42 may favor or enable coupling of a light beam from outside the light path 20, for example, by enabling total reflection of a light beam coupled into the light path 20 from outside the light path 20 by the orientation of the first interfaces. Thus, a light beam coupled into the light path segment 30 from outside the light path 20 can propagate to a tangential end of the light path segment 30. The tangential end of the light path segment 30 may denote the tangential end to which the predetermined direction of travel 34 of the light path segment 30 points.

The number of light path elements 40 of the light path segment 30 may depend on the length of the circular arc 11, as well as a radial dimension of the light path. A space needed in the radial direction by the light path may decrease in examples where the number of light path elements increases. In examples, the radius of the circular arc 11 is in the order of cm or m. However, smaller or larger radii are possible. For example, for a radius~m, the light path may have a radial dimension~cm. Although the light path segment 30 shown in FIG. 14 has two light path elements 40 for illustrative purposes, the number of light path elements 40 can generally be much larger.

In examples, the tangential length of the light path elements 40 is between 1% and 20% of the radius of the circular arc 11. Accordingly, the number of light path elements 40 of the light path 20 may be between 2 and 50 light path segments elements per 90° of the circular arc angle 32, depending on the circular arc angle 32 of the light path 20.

Figure 15:
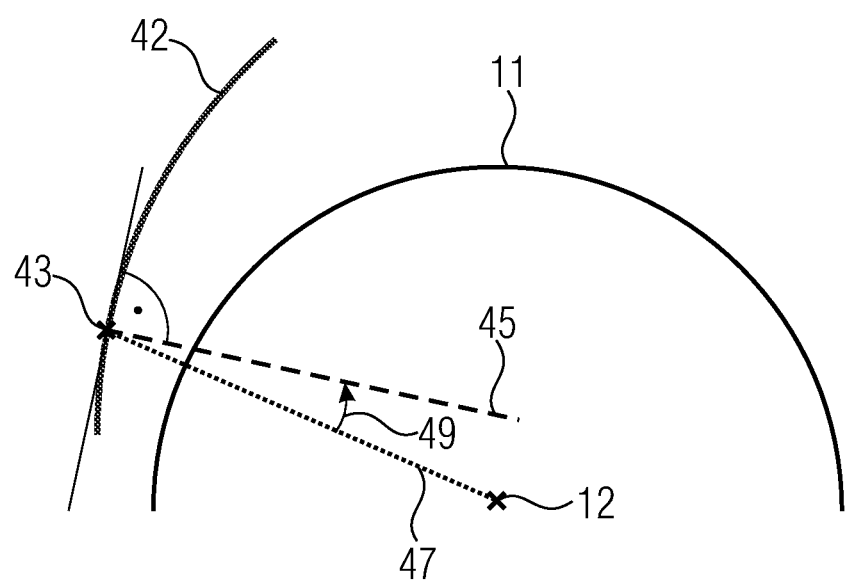
FIG. 15 is a schematic illustration of the orientation of the first interfaces according to an example of the present disclosure.

FIG. 15 shows an example of a possible configuration of the first interfaces 42. In this example, each of the first interfaces 42 of a respective light path segment 30 is configured such that, for each point 43 of the first interfaces 42, a surface normal 45 is rotated with respect to a connecting line 47 between the respective point 43 of the first interface 42 and the center of the circle 12 of the circular arc 11 within the circular plane of the circular arc 11 in a direction of rotation 49 predetermined for the respective light path segment 30. The direction of the smallest possible rotation needed to travel from the connecting line 47 to the surface normal 45 may be referred to as the direction of rotation 49.

Such a configuration of the first interfaces 42 has the effect that, when a light beam is reflected at one of the first interfaces 42, the smallest angle between the light beam and a tangent to the circular arc 11 of the light path 20 becomes smaller in the tangential position of the reflection. Thus, for example, for light beams with a tangential component in the predetermined direction of travel, an angle of incidence of an incidence on another interface of the light path segment 30 can be reduced.

In examples of the optical device described in FIG. 14, a respective intersection of the first interfaces 42 in the circular plane of the circular arc 11 with respect to the center of the circle 12 is convex or planar. This may be an embodiment of the first interfaces 42 described with respect to FIG. 15. For example, the intersection of the first interfaces in the circular plane of the circular arc 11 may describe a circular arc, which may be referred to as an interface circular arc.

Each two of the first interfaces 42, which are arranged subsequent to each other along the tangential direction, can be connected by a connecting surface. Thus, for example, one of the first interfaces and a connecting surface can be arranged alternately next to each other tangentially along the light path.

Figure 16:
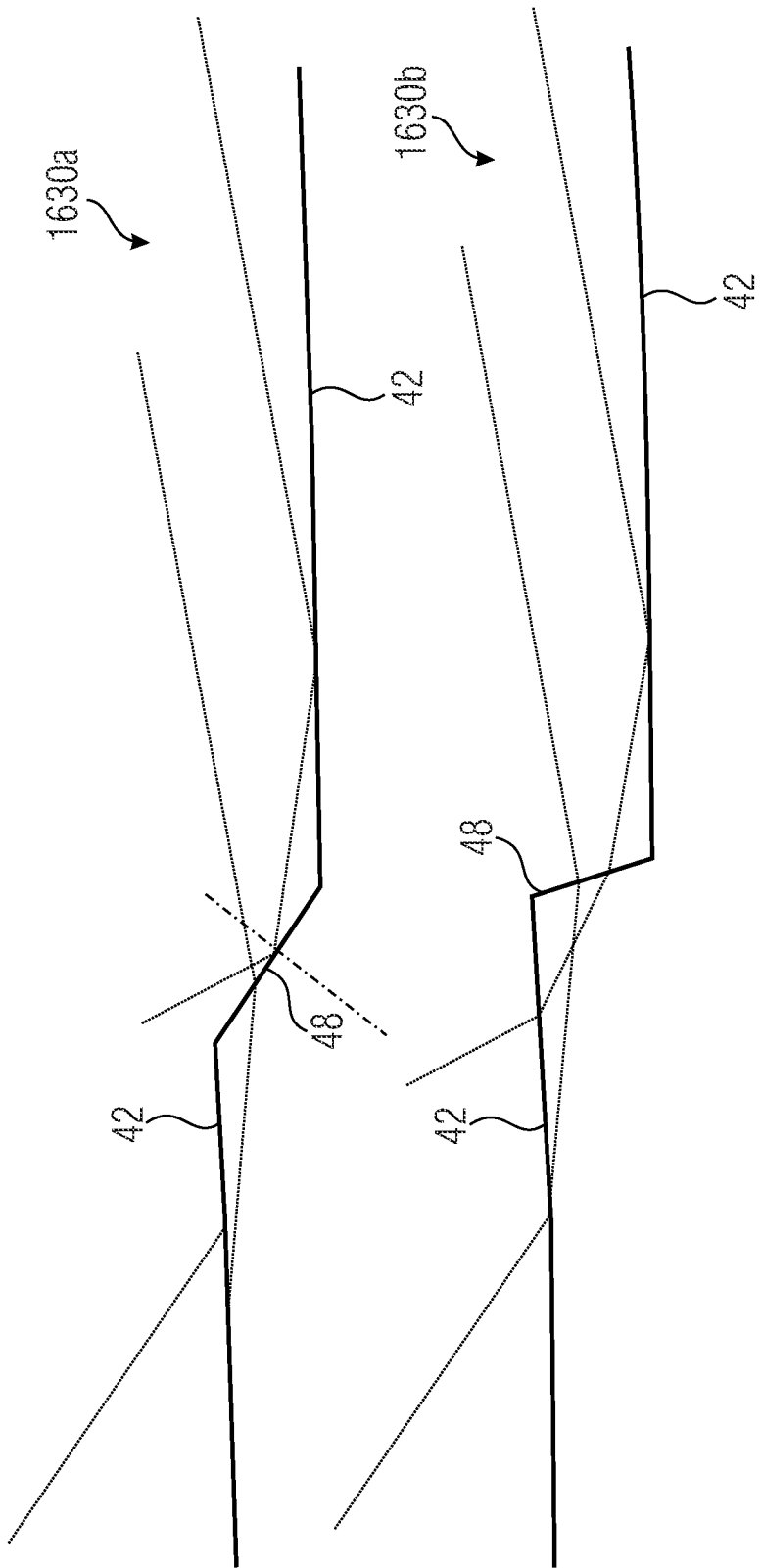
FIG. 16 is a schematic illustration of connecting surfaces between first interfaces according to an example of the present disclosure.

FIG. 16 shows connecting surfaces 48 according to examples of the present disclosure. Two examples of sections of an interface 1630a and 1630b of a light path segment 30 are shown. Accordingly, two respective first interfaces 42 may be connected by a connecting surface 48. An angle between the first interfaces 42 and the connecting surface 48 at the respective connection point may be flat, right-angled, or acute.

The connecting surface 48 may be formed asymmetrically with respect to a reflection on a surface perpendicular to the plane of the circle through the center of the circle 12 and the point of connection of the connecting surface 48 with the first interface 42 adjacent thereto.

Thus, a preferred direction for light along the predetermined direction of travel 34 is achieved.

Connecting surfaces 48, together with first interfaces 42, may at least partially limit the light path segment 30 in a radial direction, and thus together form an interface of the light path segment 30. In examples, the ratio at which the connecting surface 48 and the first interfaces 42 contribute to the interface of the light path segment formed by the same is greater than 1:5 or greater than 1:10 or greater than 1:20 (contribution of the connecting surface 48:contribution of the first interfaces 42).

In examples of the optical device 10 described in FIG. 14, the optical device 10 further comprises receiving means 70 arranged stationary with respect to the light path 20. The receiving means 70 is configured to detect light passing through one of the at least one light path segments 30 in the predetermined direction of travel 34 of the respective light path segment 30. The receiving means 70 may be configured to detect or decouple light that reaches the position of the receiving means 70 via the light path 20 from the light path 20 to detect the same. To this end, the receiving means 70 may be arranged at the tangential end of the at least one light path segment 30. For example, the receiving means 70 may provide a signal as a result of a detection of the light.

Figure 18:
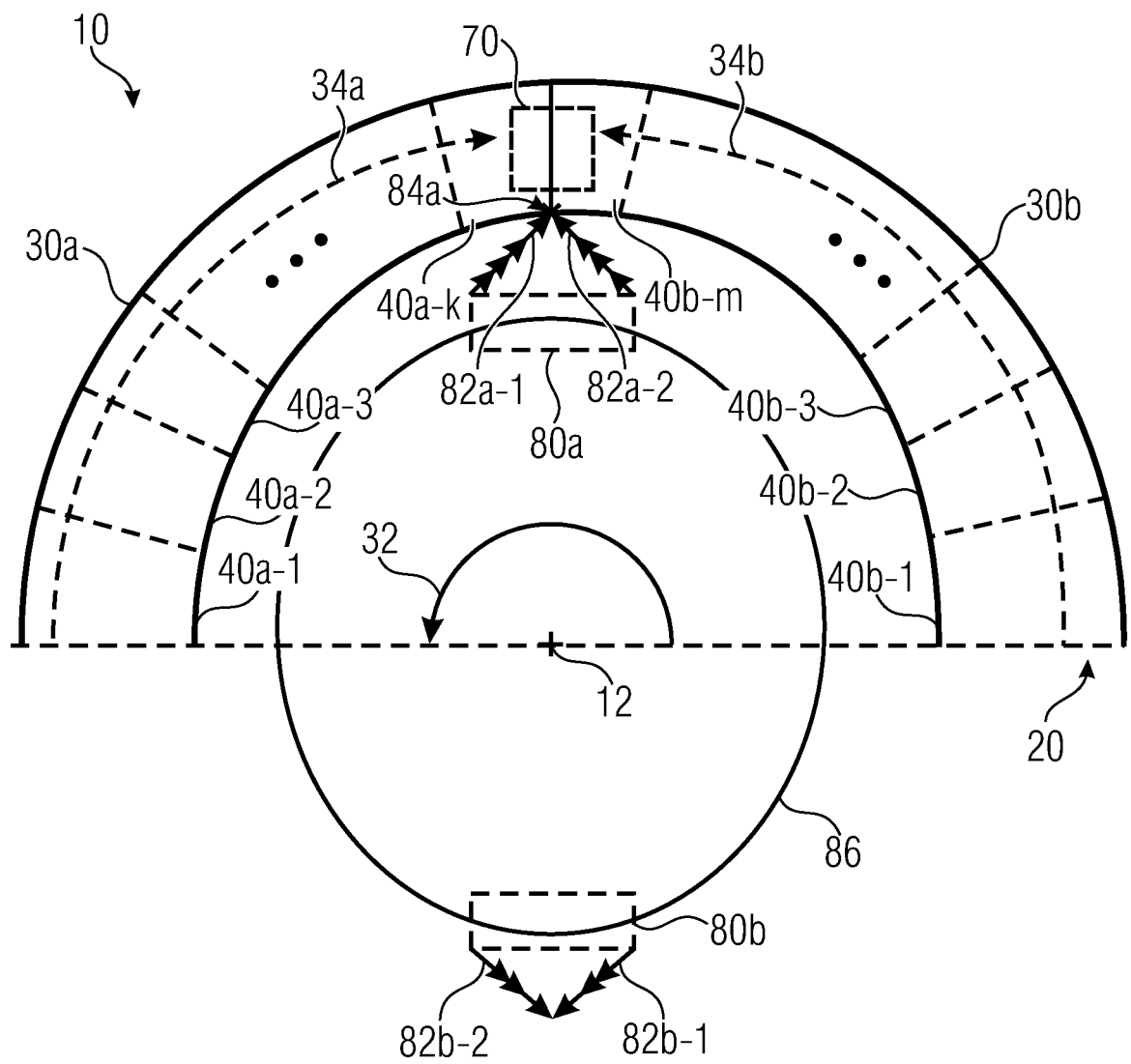
FIG. 18 is a schematic illustration of the optical device according to another example of the disclosure.

FIG. 18 shows a schematic illustration of the optical device 10 according to another example. In the example shown in FIG. 18, the optical device 10 includes a first light path segment and a second light path segment 30b. The first and second light path segments 30a and 30b are each a representative of the at least one light path segment 30. The first light path segment 30a has a predetermined direction of travel 34a. The second light path segment 30b has a predetermined direction of travel 34b. The predetermined direction of travel 34a and the predetermined direction of travel 34b are examples of the predetermined direction of travel 34. The predetermined directions of travel 34a, 34b of the first and second light path segments 30a, 30b are opposite.

The description of the light path segment 30 may apply to both the first light path segment 30a and the second light path segment 30b.

The first light path segment 30a includes a number k of light path elements 40a-1, 40a-2, ..., 40a-k. The second light path segment 30b includes a number m of light path elements 40b-1, 40b-2, 40b-3, ..., 40b-m. The number k and the number m may be identical. The first light path segment 30a and the second light path segment 30b may each individually represent or correspond to an example of the light path segment 30.

The first light path segment and the second light path segment may be arranged tangentially along the light path, and may be arranged adjacent to each other. The second light path segment may be arranged such that its tangential end is adjacent to the tangential end of the first light path segment.

The receiving means 70 may be arranged at the tangential end of both of the first and second light path segments. That is, the tangential end of the first light path segment may be arranged adjacent to the tangential end of the second light path segment. Alternatively, the receiving means 70 may be arranged between the tangential ends of the first and second light path segments.

If the light path includes a single light path segment, a runtime jump can occur when a transmitter rotates past the receiving means 70, because the light, when it is coupled in at one end of the light path, has to travel the complete runtime segment, for example a complete round in the optical fiber, due to the predetermined direction of travel, whereas it was previously coupled in at the other end of the light path near the receiving means, and thus irradiated almost directly. In contrast, a higher data rate can be achieved with two light path elements with opposite predetermined directions of travel, since, for example, the run time from a transmitter to the receiving means changes continuously during a rotation.

FIG. 18 further shows a first transmitting unit 80a and a second transmitting unit 80b, which may be part of the optical device 10 or may be arranged adjacent to the optical device 10 during operation of the same. The transmitting units 80a, 80b are arranged on a circular path 86 concentric to the light path 20, rotatable relative to the light path 20. In the example shown in FIG. 18, the transmitting units 80a, 80b each emit a first light beam 82a-1, 82b-1 having a tangential component along the direction of travel 34a of the first light path segment and each emit a second light beam 82a-2, 82b-2 having a tangential component along the direction of travel 34b of the second light path segment 30b. The light beams 82a-1, 82a-2 from the first transmitting unit are oriented to impinge on the light path 20 at a point 84a that depends on the rotational position of the transmitting unit 82a with respect to the light path 20. Depending on whether the light beams are incident on the first light path segment or the second light path segment, at least one of the light beams couples into the respective light path segment.

In the example shown in FIG. 18, the light path 20 comprises an angular circular arc 32 of 180°, with each of the light path segments 30a, 30b comprising half of the light path 20. The arrangement of the transmitting units 80a, 80b on the concentric circular path opposite each other ensures that for each angle of rotation between the transmitting units 80a, 80b and the light path 20 at least one of the transmitting units 80a, 80b is positioned such that at least one of the light beams from the at least one transmitting unit can couple into the light path 20. To achieve this, the number of transmitting units may be selected to be at least as large as the fraction of a whole circle encompassed by the light path 20. This can ensure uninterrupted signal transmission between the transmitting units and the receiving means for all angles of rotation between the transmitting units and the light path 20 or to the receiving means 70.

Thus, in examples, the optical device 10 comprises at least one transmitting unit 80a, 80b, the at least one transmitting unit and the light path 20 being arranged such that the at least one transmitting unit is rotatable relative to the light path on a circular path concentric to the light path. The at least one transmitting unit is configured to emit at least one light beam 82a-1, 82a-2, 82b-1, 82b-2, which signals a signal, in the direction of the circular path 11 of the light path 20, i.e., for example, the circular path 11 on which the light path is rotatably arranged relative to the at least one transmitting unit. The radius of the concentric circular path may be larger or smaller than the radius of the circular arc 11 of the light path 20. The light beam is oriented such that the light from the light beam can couple into the light path, thus illuminating the light path. A radiation direction relative to the transmitting unit may be fixed. By rotating the transmitting unit relative to the light path, the light beam may be coupled into the light path at different or arbitrary tangential positions. For example, the transmitting unit may be arranged adjacent to the light path in radial direction. In examples, as explained in more detail with reference to FIG. 5, the transmitting unit may be arranged at any position around the cross-section of the light path. In this case, the cross-section is a section along a plane perpendicular to the circular plane. One or more or all of the transmitting units of the at least one transmitting unit may be arranged in a fixed manner relative to each other.

In examples, the light path comprises an n-th fraction of an entire circle, and the at least one transmitting unit includes a number of n transmitting units that are equally distributed along the concentric circular path, i.e., the transmitting units are spaced apart by angles of 360°/n.

The number of light beams emitted from each of the transmitting units 80a, 80b may depend on the number of light path segments 40, 40a, 40b of the light path. A tangential component of the light beams emitted by the transmitting units may be adapted to the predetermined direction of travel of the light paths. Thus, for a light path having a single light path segment, such as shown in FIG. 14, each of the transmitting units may emit one light beam, while for a light path having two light path segments with opposite predetermined directions of travel, it may be appropriate for each of the transmitting units to emit two light beams with opposite tangential members.

In examples where the at least one light path segment includes first and second light path segments 34a, 34b, and the optical device 10 includes the at least one transmitting unit 80b, the at least one transmitting unit may be configured to transmit a first light beam 82a-1, 82b-1 and a second light beam 82a-2, 82b-2, in the direction of the circular path of the light path. A tangential component of the directional vector of the first light beam 82a-1, 82b-1 points in the predetermined direction of travel 34a of the first light path segment 30a, and a tangential component of the directional vector of the second light beam 82a-2, 82b-2 points in the predetermined direction of travel 34b of the second light path segment 30b. The first light beam and the second light beam may transport the identical signal simultaneously. The two light beams may be aligned to enter the light path at the same position 84a, with opposite tangential members of their direction.

Further examples of the optical device 10 having a first light path segment and a second light path segment are described with respect to FIGS. 3-7 and 9 and 10.

In the following, examples of the optical device 10 are described in which the light path 20 is implemented by means of optical fiber structures or by means of mirror elements. The number of light path segments, the length of their circular arcs, as well as the number of transmitting units and/or the number of light beams emitted by the respective transmitting units can be selected independently of whether the optical device is implemented by means of optical fiber structures or by means of mirror elements, so that embodiments which are shown on optical fiber structures can also be implemented by means of mirror elements and vice versa.

Figure 4:
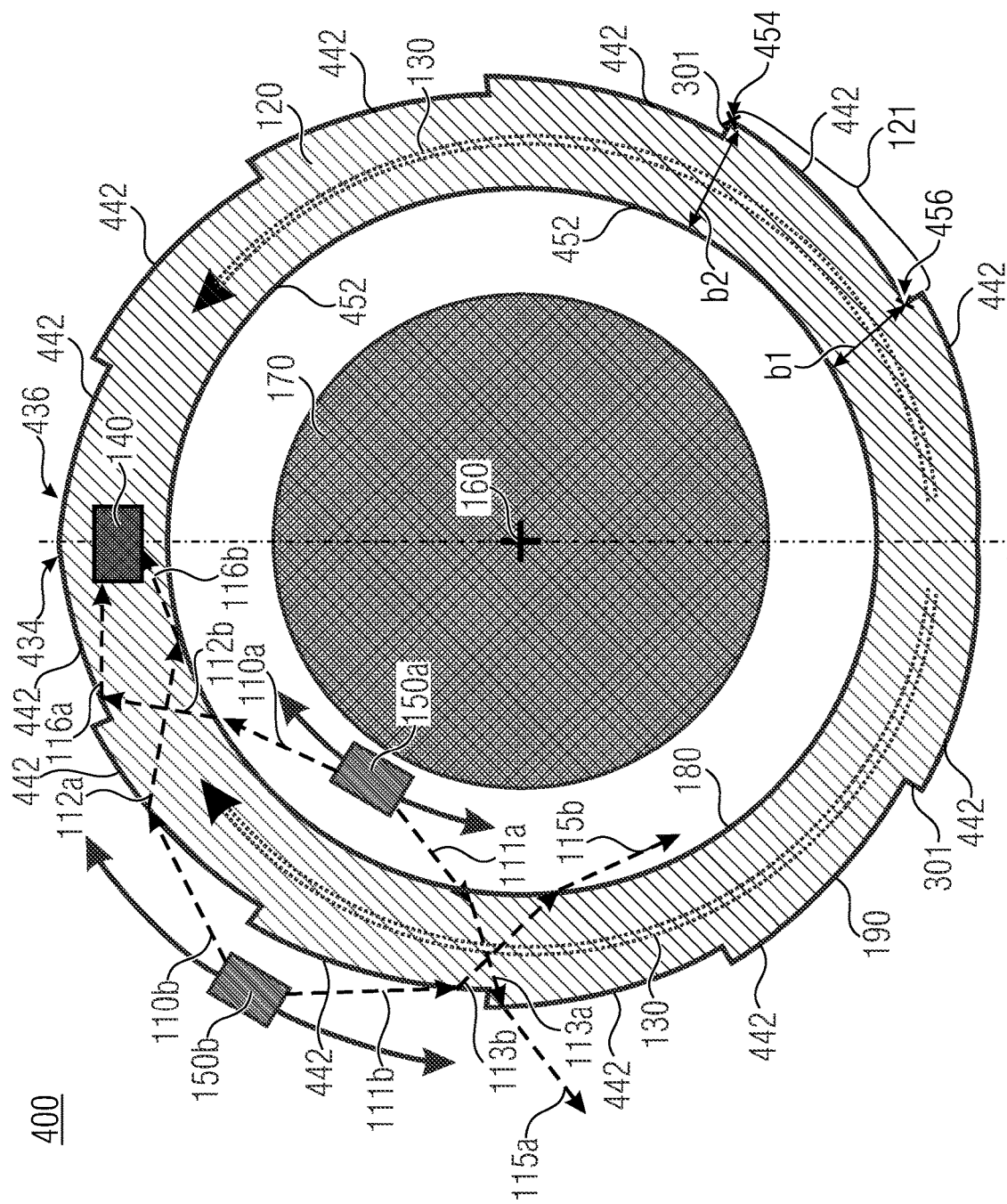
FIG. 4 is a top view of an optical device having wedge-shaped optical fiber elements according to another example of the present disclosure.

FIG. 4 shows a top view of an optical device 400 according to an example of the present disclosure. The optical device 400 may correspond to the optical device 10. The light path of the optical device 400 comprises a first light path segment 434 and a second light path segment 436, which represent examples of the light path segment 30, 30a, 30b, and whose predetermined directions of travel 130 are opposite. The predetermined directions of travel 130 are examples of the predetermined direction of travel 34.

The light path segments 434, 436 comprise light path elements 121, which may correspond to the light path elements 40 of FIG. 14 or the light path elements 40a-1, . . . 40b-k, 40b-1, . . . , and are formed by one or more optical fibers. Each of the light path elements 121 is limited at least in part, by respective first interfaces 442 along a direction radially outward. The first interfaces 442 may correspond to the first interfaces 42. Further, each of the light path elements 121 is respectively limited, at least in part, by a second interface 452 along a direction radially inward. The first interfaces 442 may each be part of an outer interface 190 of an optical fiber 120. The second interfaces 452 may each be part of an inner interface 180 of the optical fiber 120. In other words, the optical device 400 includes an optical fiber structure having wedge-shaped optical fiber elements on an outer surface 190 of the optical fiber structure. In alternative examples, each of the light path elements 121 is respectively limited, at least in part, by one of the second interfaces 452 along a direction radially inward and is respectively limited, at least in part, by a first interface 442 along a direction radially outward. That is, each of the light path elements 121 is limited, at least in part, by a respective different one of the first interface 42, 442 and a second interface 452 along a direction radially inward and outward. The second interfaces 452 of the light path elements are each configured to reflect light incident from the light path at an angle of incidence greater than a critical angle of the respective second interface onto the respective second interface, to keep a light beam propagating along the light path in a predetermined direction of travel 130 for the respective light path segment. The light path elements 121 are wedge-shaped and have a greater expansion in the radial direction at a first tangential end 454 than at a second tangential end 456.

For example, the light path elements 121 may be arranged such that, for the light path elements of a respective light path segment 434, 436, the direction along the light path along which one travels from the first tangential end 454 of the light path element across the light path element to the second tangential end 456 of the light path element is uniform. For the light path elements of a respective light path segment 434, 436, the direction along the light path along which one travels from the first tangential end 454 along the light path element to the second tangential end 456 of the light path element may be opposite to the direction of travel 130 predetermined for the respective light path element.

In examples as shown in FIG. 4, the second interfaces 452 of a respective light path segment together form a circular arc around the center of the circle of the light path.

Figure 3:
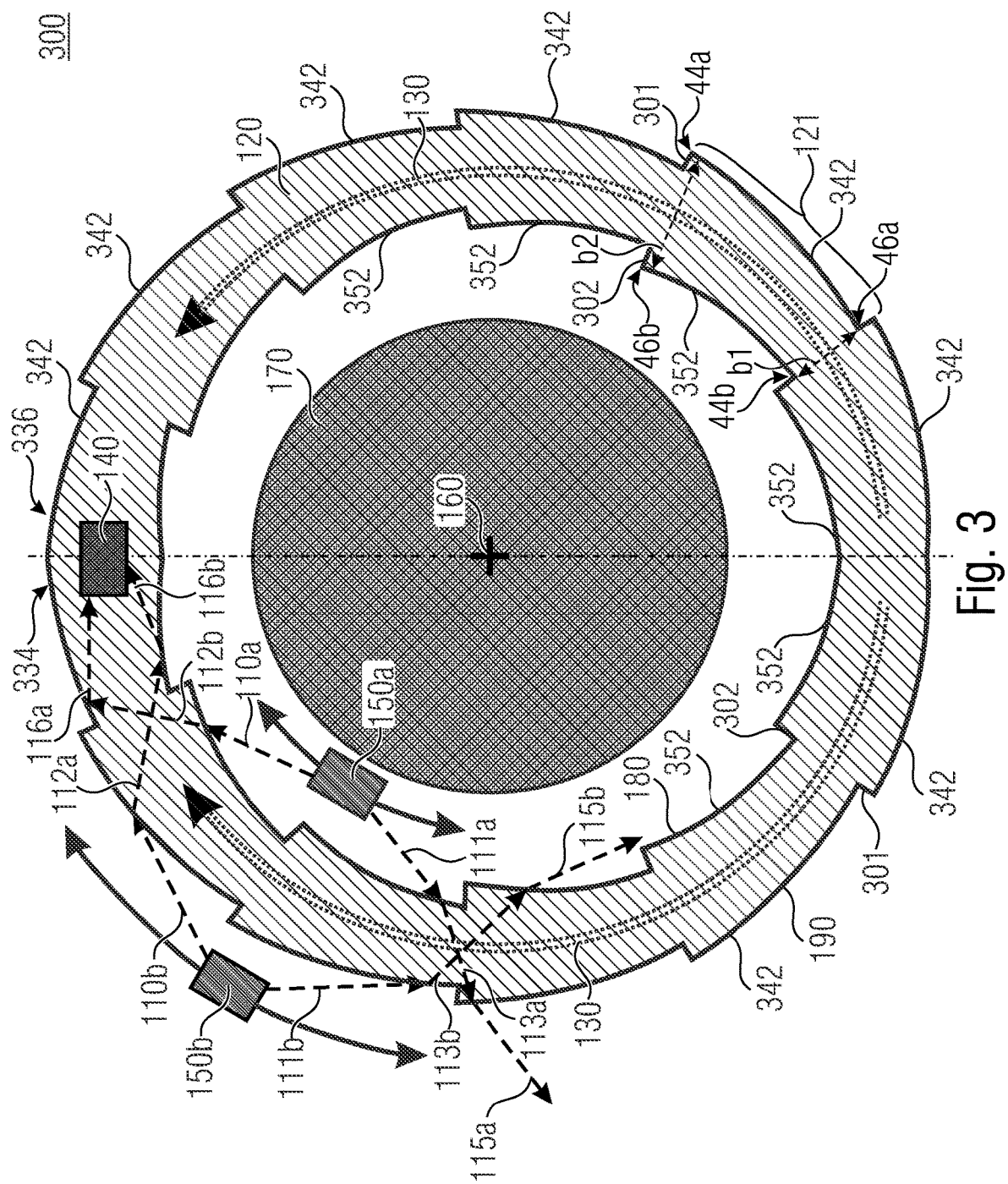
FIG. 3 is a top view of an optical device having wedge-shaped optical fiber elements according to an example of the present disclosure.

Further details of the optical device 400 are described with respect to FIG. 3. Further, features which are explained with respect to FIG. 1 and FIG. 2 are also applicable to the device 400, although the same differs from the device 100, 200 at least in the configuration of the optical fiber elements and thus in the propagation of the light beams.

FIG. 3 shows a schematic illustration of an optical device 300 according to an example of the present disclosure. The optical device 300 may correspond to the optical device 10. In the optical device 300, the first interfaces 342 limit the light path segments 334, 336 radially outward, and the second interfaces 352 limit the light path segments radially inward. The second interfaces 352 are configured in accordance with the first interfaces. I.e., the statements herein, particularly also regarding FIG. 14 and FIG. 4 with respect to the first interfaces 42, 442, for example, with respect to the orientation and arrangement of the first interfaces 42, 442 also applies to the second interfaces 352 of the optical device 300 unless otherwise described. The fact that the second interfaces are configured in accordance with the first interfaces is not intended to mean that, within an embodiment, the first interfaces are necessarily configured identically to the second interfaces compared to the second interfaces.

The optical device 400 comprises a first light path segment 334 and a second light path segment 336 whose predetermined directions of travel 130 are opposite. The first interfaces 342 may each be part of an outer interface 190 of the optical fiber 120, and may be arranged in accordance with the first interfaces 442. The second interfaces 352 may each be part of an inner interface 180 of the optical fiber 120.

In examples of the optical device 300, the first tangential end 44a of the first interfaces 342 of a respective light path element faces the second tangential end 46*b* of the second interface 352 of the respective light path element in radial direction. Accordingly, the second tangential end 46*a* of the first interfaces further 342 of a respective light path element faces the first tangential end 44*b* of the second interface 352 of the respective light path element in radial direction, as shown in FIG. 3. Thus, tilting of the first and second interfaces with respect to the tangential direction, or the direction of rotation 49 of the surface normal 45 as explained with respect to FIG. 15, is opposite for the first interfaces 342 and the second interfaces 352.

Figure 13:
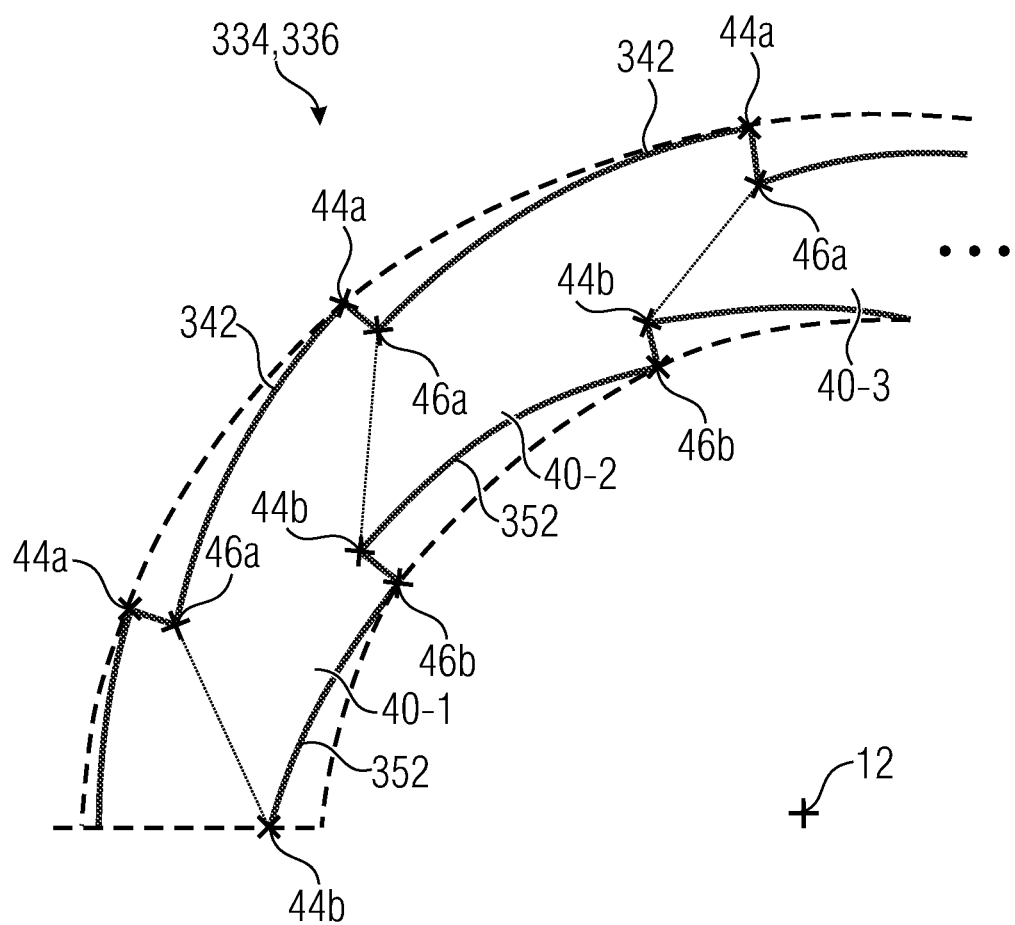
FIG. 13 is a schematic illustration of wedge-shaped light path segments according to another example of the present disclosure.

FIG. 13 shows a section of light path segment 334, 336 according to another example. The section shown includes light path segments 40-1, 40-2, 40-3. In the example shown in FIG. 13, for the first interfaces 342 of a respective light path segment 334, 336, the direction of travel from the first tangential end 44*a* along the respective first interface 352 to the second tangential end 46*a* is opposite to the direction of travel 130 predetermined for the respective light path segment 334, 336. For the second interfaces 352 of a respective light path segment 334, 336, on the other hand, the direction of travel from the first tangential end 44*b* along the respective second interface to the second tangential end 46*b* corresponds to the direction of travel predetermined for the respective light path segment 334, 336. Also in this example, the second interfaces may be configured in accordance with the first interfaces. Thus, tilting with respect to the respective tangential direction, or the direction of rotation 49 of the surface normal 45 as explained with respect to FIG. 15, is opposite for the first interfaces 342 and the second interfaces 352. This results in a wedge-shaped configuration of the light path elements, wherein the tangential ends of the respective first and second interfaces of a light path element do not necessarily have to be opposite to each other. Rather, they can be arranged offset from one another.

This may mean, for example, that for a light path segment 342, a direction along the light path for traveling from the first tangential end 44*b* of the second interfaces 352 along the second interfaces 352 to the second tangential end 46*b* of the second interfaces 352 may be opposite to a direction along the light path along which to travel from the first tangential end 44*a* of the first interfaces 342 along the first interfaces 46*a* to the second tangential end of the first interfaces 342.

For example, the first and second interfaces 342, 352 may be arranged offset from each other in a tangential direction with respect to the light path. For example, the tangential positions of at least several of the first and second ends of the first interfaces differ from the tangential positions of the first and second ends of the second interfaces. This can potentially increase a coupling efficiency.

Thus, the optical device 400 may correspond to the optical device 300, wherein the optical fiber structure of the optical device 400 is adapted such that only the outer interface 190 is adapted to produce a wedge-shaped structure. Likewise, it is conceivable to adapt only the inner interface. Thus, the first interfaces 342 may correspond to the first interfaces 442 as described with respect to FIG. 4. Examples of the optical device 300 may thus differ from examples of the optical device 400 mainly by the configuration of the light path elements 121. In both optical device 300 and optical device 400, the configuration of light path elements 121 results in a wedge-shaped arrangement of opposing first and second interfaces.

In examples, a wedge angle (for example, wedge angle 1248 as described with respect to FIG. 12) between each of the first interface or the second interface is between 1° and 10° or between 2° and 6°. Here, the wedge angle is the sum of a first angle of the respective first interface and a second angle of the respective second interface. The respective first interface 42 and the respective second interface may be associated with the same light path element 42. The first angle is the smallest angle between the line connecting the first tangential end 44*a* and the second tangential end 46*a* of the respective first interface 342 and the tangent to the circular arc 11 of the light path at a point centered in tangential direction between the first tangential end 44*a* and the second tangential end 46*a* of the respective first interface. The second angle is the smallest angle between the line connecting the first tangential end 44*b* and the second tangential end 46*b* of the respective second interface 352 and the tangent to the circular arc 11 of the light path at a point centered in the tangential direction between the first tangential end 44*b* and the second tangential end 46*b* of the respective second interface. Accordingly, this may apply to the first interface 442 and the second interface 452 of the embodiment shown in FIG. 4, wherein the first ends of the respective interfaces may be arranged at the first end 454 of the light path segment 121 and the second ends of the respective interfaces may be arranged at the second end 456 of the light path segment 121.

In other words, in the optical devices 300, 400 shown in FIG. 3 and FIG. 4, the outer interface 190 and inner interface 180 are arranged in a wedge shape relative to each other. As a result, the distance between the two interfaces is no longer constant, but increases starting from a minimum distance b1 to a maximum distance b2. For this purpose, the optical fiber structure is composed of several wedge-shaped sections 121, which are connected to each other. The wedge-shaped arrangement makes it possible to prevent the coupled-in beams 112*a*, 112*b* from exiting the optical fiber 120 by means of possible total reflection and thus to couple them reliably into the optical fiber structure. Here, coupling is enabled in only one direction 110*a*, 110*b*. A preferred direction 130 results, in which the optical fiber structure supports both coupling and transmission. This is prevented for light in the opposite direction 111*a*, 111*b*. This is important with respect to the desired data rates, for example, also for preventing multipath propagation. The transmitting unit 150 is advantageously configured to emit light 110*a*, 110*b*, 111*a*, 111*b* in both circulating directions. Only the partial beam with the shortest light path between transmitter 150 and receiver 140 is passed on via the optical fiber structure. If the transmitter is exactly 180° offset from the receiver, a special case occurs in which both partial beams 110, 111 are passed on. Due to the then equal path length, there is no multipath propagation and a data rate in the range >$10^9$ bit/s is possible.

At the contact point of two wedge-shaped sections, a step 301 is formed in the propagation direction 130 at the transition from a wide end of a section b2 to a narrow end of the following section. These areas 301, 302 potentially represent a decoupling point and can lead to partial light decoupling and thus loss. The strength of the wedge shape (b1-b2) and the transition points 301, 302 can be used specifically to set a signal attenuation to specifically prevent multipath propagation. This ensures that the data signal is only transmitted via the shortest path.

FIG. 3 and FIG. 4 further show two transmitting units 150*a*, 150*b*, one or both of which may optionally be part of the optical device 300. The transmitting unit 150*a* is arranged radially inside the light path, while the transmitting unit 150*b* is arranged radially outside the light path. Thus, the transmitting units 150*a* and 150*b* each represent an example of an arrangement of a transmitting unit, for example, one of the transmitting units 80a or 80b. It may be sufficient or even advantageous to arrange a transmitting unit at a tangential position either inside or outside the light path. The transmitting unit 150a, 150b is configured to radiate a first light beam 110a, 110b and a second light beam 111a, 111b into the light path. The first light beam 110a, 110b comprises a tangential component in the direction of the predetermined direction of travel 130 of the first light path segment 334, 434. The second light beam 111 a, 111 b comprises a tangential component in the direction of the predetermined direction of travel 130 of the second light path segment 336, 436. If the first light beam 110 a or 110 b impinges on an entrance interface of one of the light path elements 121 of the first light path segment 334, 434, the light beam is refracted into the optical fiber, or the light path, so that an entrance light beam 112a or 112b propagates in the optical fiber. The entrance interface may be the first or the second interface 342, 352, 442, 452 of the light path element 121, depending on the arrangement of the interfaces and depending on whether the transmitting unit 150a, 150b is arranged inside or outside the light path. If the entrance light beam 112a or 112b impinges on an interface of the light path segment opposite to the entrance interface, due to the orientation of the first and/or second interfaces 342, 352, 442, 452, the entrance angle of the entrance light beam on the interface opposite to the entrance interface may be so large that total reflection occurs and thus a reflected light beam 116a, 116b propagates within the light path. When the second light beam 111 a or 111 b impinges on the entrance interface of one of the light path elements 121 of the first light path segment 334, 434, the light beam is refracted into the optical fiber, or light path, so that an entrance light beam 113a or 113b propagates in the optical fiber. If the entrance light beam 113a or 113b impinges on an interface of the light path segment opposite the entrance interface, the orientation of the first and/or second interfaces 342, 352, 442, 452 may cause the entrance angle of the entrance light beam on the interface opposite the entrance interface to be such that the reflected light beam 115a, 115b exits the light path. Thus, the predetermined direction of travel or preferred direction of the light path segment results. With respect to the second light path segment 336, 436, the roles of the first light beams 110a, 110b and second light beams 111a, 111b may be reversed due to their opposite tangential components.

In examples, the optical device 300, 400 further comprises at least one of the transmitting units 150a, 150b. In this case, the at least one transmitting unit and the light path are arranged such that the at least one transmitting unit is rotatable relative to the light path on a circular path concentric to the light path, wherein the radius of the concentric circular path is smaller or larger than the radius of the circular arc of the light path. Here, the at least one transmitting unit is configured to emit at least one light beam 110a, 110b, 111a, 111b, which signals a signal, in the direction of the circular path of the light path. The radiation direction of the at least one light beam is selected such that the at least one light beam is coupled into the light path by refraction when the same impinges on one of the first interfaces 42, 342, 442 or the second interfaces 352, 452 of one of the at least one light path segment 30, 334, 336, 434, 436. For example, the radiation direction is selected in such a way that at the first or second interface, where the light beam impinges on the light path element, i.e. when coupled in, as little Fresnel reflection as possible occurs, but, at the same time, total reflection still occurs at the opposite interface.

In examples, the radiation direction of the at least one light beam 110a, 110b, 111a, 111b is selected such that the angle of incidence of the at least one light beam when incident on one of the first or second interfaces is less than 80°, or less than 75°, or is in a range between 60° and 80°, or in a range between 65° and 75°. For an interface between air or other gas and an optical waveguide, a large portion of the light beam is refracted into the light path in this range of the incidence angle. Further, it is enabled that the entrance light beam 112a, 112b is refracted at the interface opposite to the entrance interface and reflected by means of total reflection. The angle of incidence is also explained in more detail with reference to FIG. 12.

In examples, the interfaces 190 limiting the light path elements of the light path segments 334, 336, 434, 436 radially outward are formed in a convex manner along the axial direction of the circular arc with respect to the center of the circle 12 of the circular arc, and wherein the interfaces 180 limiting the light path elements radially inward are formed in a concave manner along the axial direction of the circular arc with respect to the center of the circle of the circular arc. Examples of such light path segments are shown in FIGS. 5 and 6.

Figure 5:
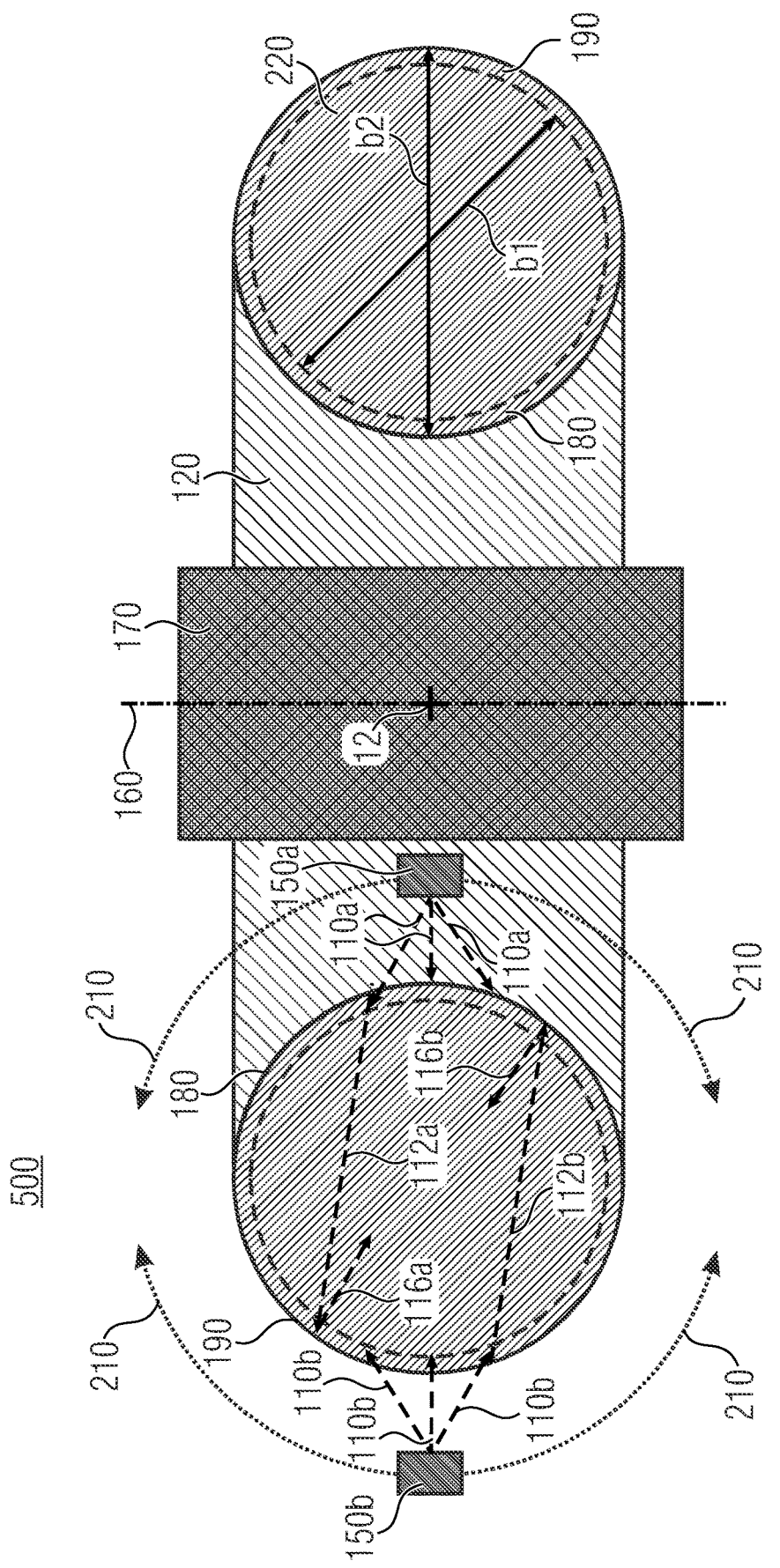
FIG. 5 is a sectional view of an optical device having wedge-shaped optical fiber elements in accordance with an example of the present disclosure.

FIG. 5 shows a sectional view along a plane along the center axis 160 of an optical device 500 according to an example of the disclosure. The optical device 500 may correspond to the optical device 300, 400. The optical device 500 includes an optical fiber structure having wedge-shaped optical fiber elements and a circular cross-sectional area. Here, the wedge shape of the optical fiber elements is represented by two circular cross-sectional profiles b1, b2. The dashed circle represents the narrower end of a wedge-shaped optical fiber element 121. The solid circle represents the wider end of a wedge-shaped optical fiber element 121. The cross-section of the optical fiber structure 220 is symmetrically circular. In this case, the transmitting unit 150a and/or the transmitting unit 150b may be arranged 360° around the cross-sectional area with respect to the circular plane of the light path. The transmitting units shown are to be considered as exemplary. It is technically possible to arrange multiple transmitters around the cross-sectional area 220 of the optical fiber structure, for example to increase the available optical power. However, the use of a single transmitter at a respective tangential position has the advantage that it is easier to guide both signals synchronously and to detect them without runtime differences at the receiver 140.

Figure 6:
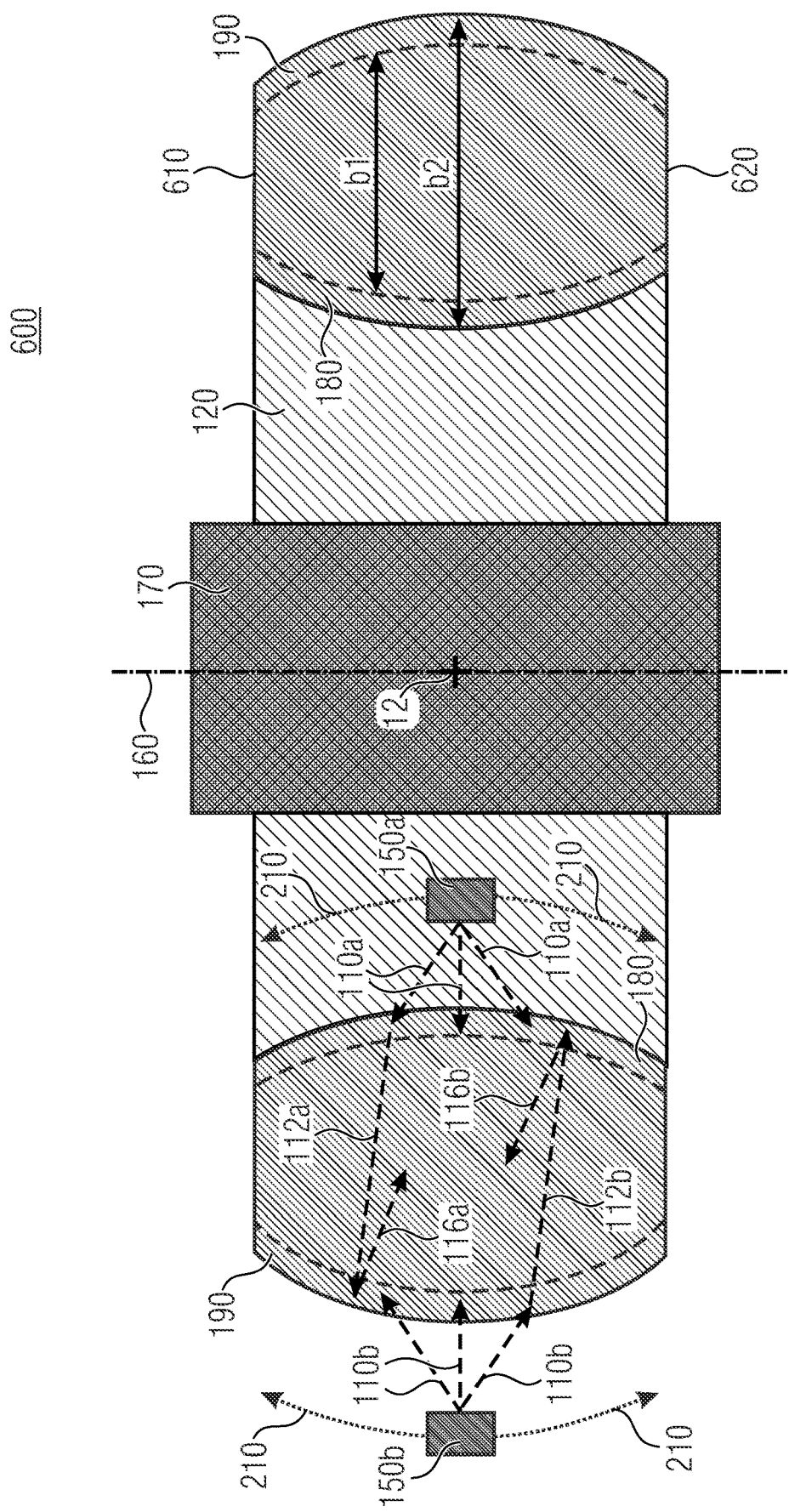
FIG. 6 is a sectional view of an optical device having wedge-shaped optical fiber elements according to an example of the present disclosure.

FIG. 6 shows a sectional view of an optical device 600 according to an example of the disclosure. The optical device 600 includes an optical fiber structure having wedge-shaped optical fiber elements and curved inner and outer surfaces. The optical device 600 may correspond to the optical device 300 or 400. FIG. 6 shows the optical device 600 in cross-section along a plane along the center axis 160. Unlike the optical device 500, the optical fiber of the optical device 600 has a matched non-circular cross-sectional area. Here, the inner interface 180 and the outer interface 190 are not necessarily connected to each other. As a result, an upper connecting surface 610 and/or a lower connecting surface 620 may be formed. However, this is not needed. The outer and inner surfaces can also be directly connected to each other. The shape of the inner and outer interfaces can take various forms. These can be spherical, aspherical, parabolic curvatures or also arbitrary free forms. A specific ordered light guidance is to be aimed at, in order to prevent runtime difference, which would otherwise limit the maximum data rate.

Due to the wedge-shaped arrangement of the inner and outer surfaces, as shown with reference to FIGS. 3 through 8, the light is reflected in the preferred direction 130 less toward the axis of rotation and more radially outward. Ideally, once coupled in, the light is guided exclusively by the outer interface and does not touch the inner surface at all. Via the configuration of the same 190, the light signal can thus be controlled/guided very well and multipath propagation can be prevented/minimized. This applies in particular to the described embodiments 300, 400, 500, 600, 700, 800, 900 by means of optical fiber elements or mirror elements, but also generally to the inventive configuration of the light path segments 30 of the optical device 10.

Figure 7:
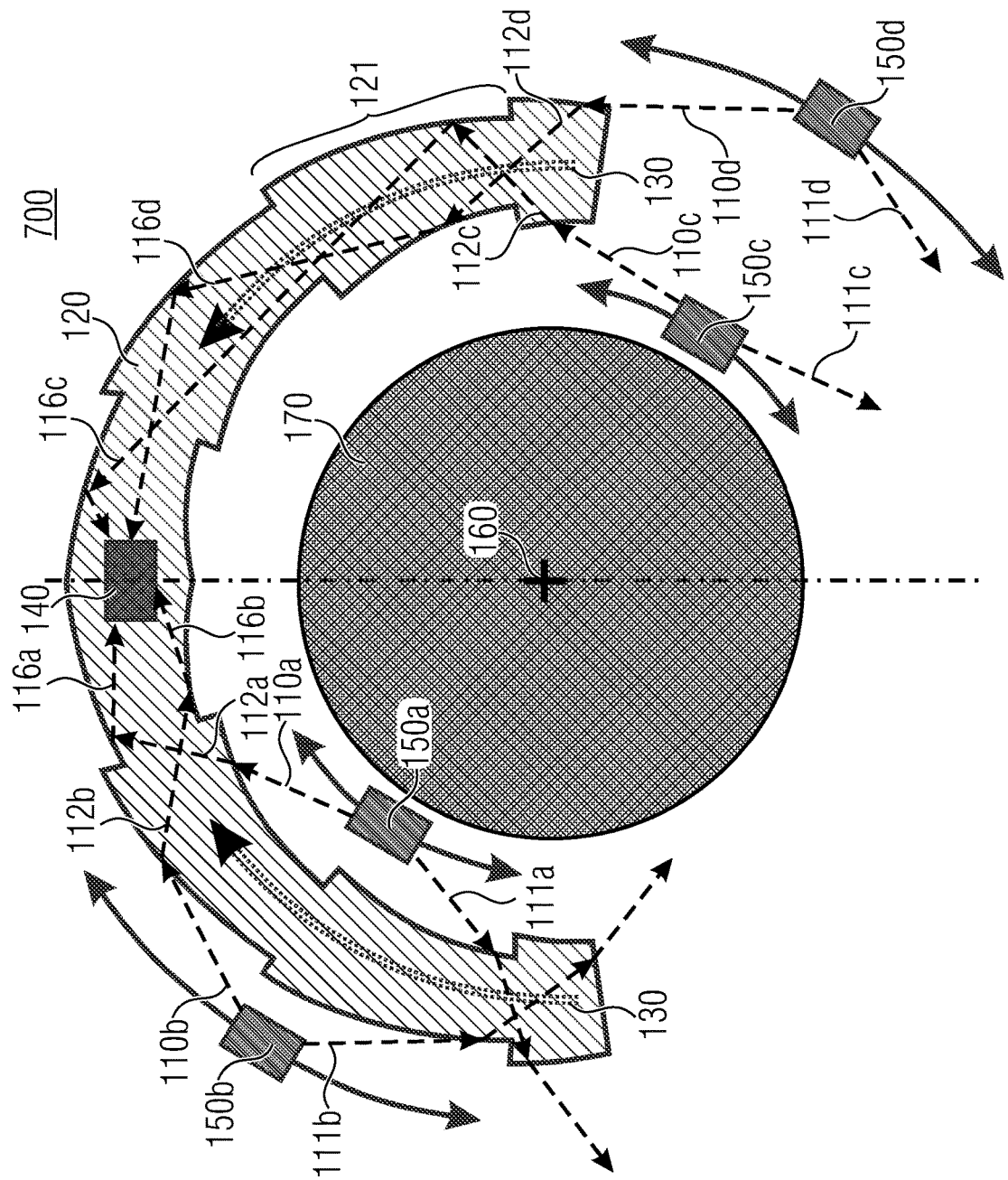
FIG. 7 is a top view of an optical device having wedge-shaped optical fiber elements according to another example of the present disclosure.

FIG. 7 shows a top view of an optical device 700 according to an example of the disclosure. The optical device 700 includes an optical fiber structure having wedge-shaped optical fiber elements. The optical device 700 may correspond to the optical device 10, and may further correspond to the optical device 300, 500, 600, except that the same includes a plurality at least 2 transmitting elements 150, which are equally, distributed about the axis of rotation either inside 150a, 150c or outside 150b, 150d the area of the optical fiber structure. By increasing the number of transmitters, the size of the optical fiber structure has to be reduced. In this case, the optical fiber structure has to be just large enough so that at least one transmitter can reach the receiver via the optical fiber structure. The more transmitters there are, the smaller the optical fiber structure may theoretically become. The optical fiber structure is mirrored and the receiver unit is located in the center so that the mirror axis runs exactly through the receiver. The wedge structure is again structured such that the preferred direction 130 runs from both sides towards the receiver 140. This is needed to ensure uninterrupted data transmission during rotation. Runtime differences between two transmitters at different distances from the receiver are prevented by specific attenuation of the optical fiber structure. Thus, the transmitter with the shortest distance prevails. If the runtime differences between the transmitters decrease as a result of further rotation, the proportions of the received signal are also equalized. In this way, a runtime jump is prevented and uninterrupted transmission is achieved.

Figure 8:
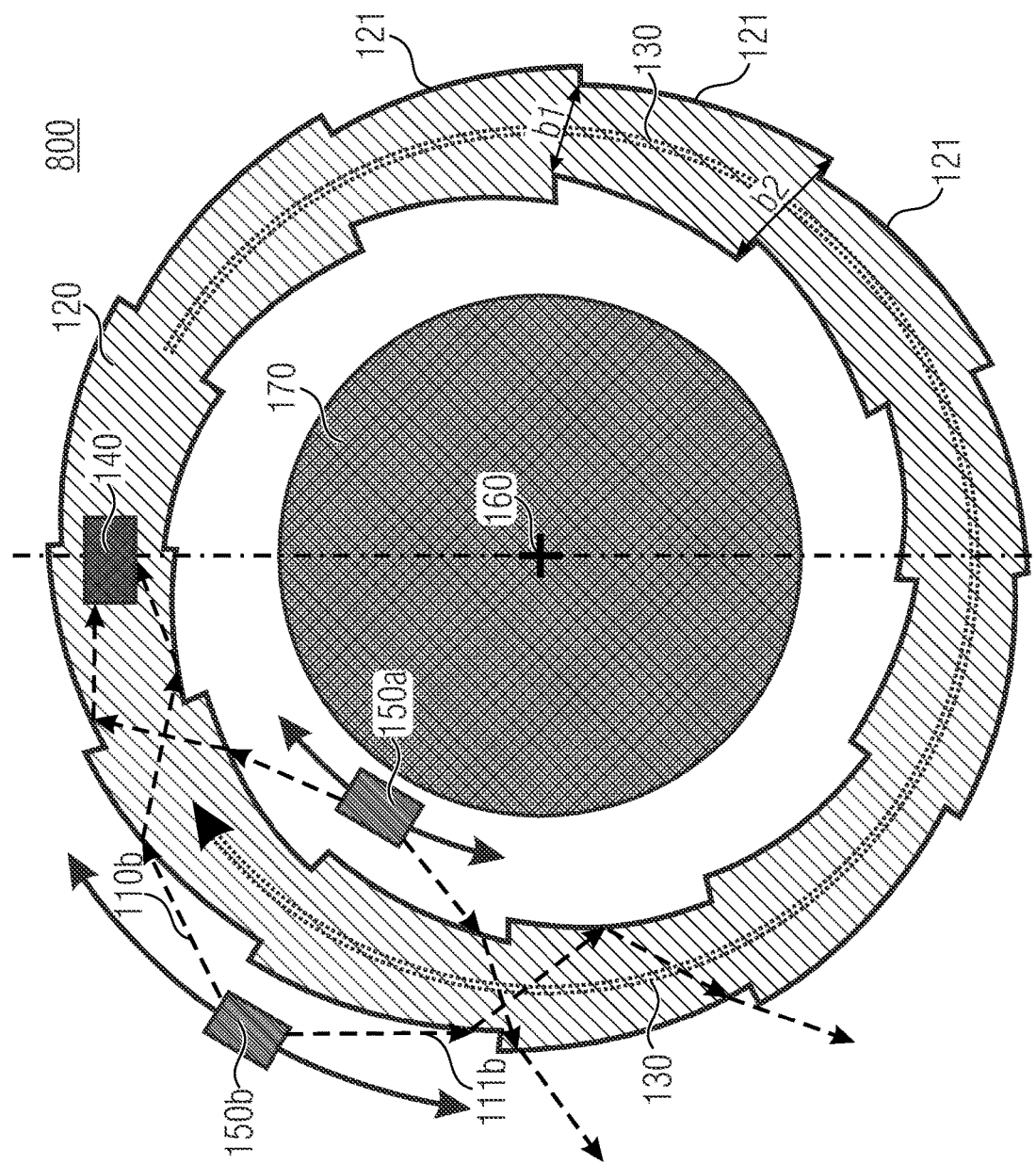
FIG. 8 is a top view of an optical device having wedge-shaped optical fiber elements according to another example of the present disclosure.

FIG. 8 shows an illustration of an optical device 800 according to an example of the disclosure. The optical device 800 includes an optical fiber structure having wedge-shaped optical fiber elements without symmetrical arrangement, for example with only one light path segment. The optical device 800 may correspond to the optical device 10. The optical device 800 includes a light path segment. The configuration of the light path segment may correspond to that of one of the optical devices 300, 400, 500, 600, 700, 900. For low data rates, the optical device may provide a simple implementation option.

Figure 9:
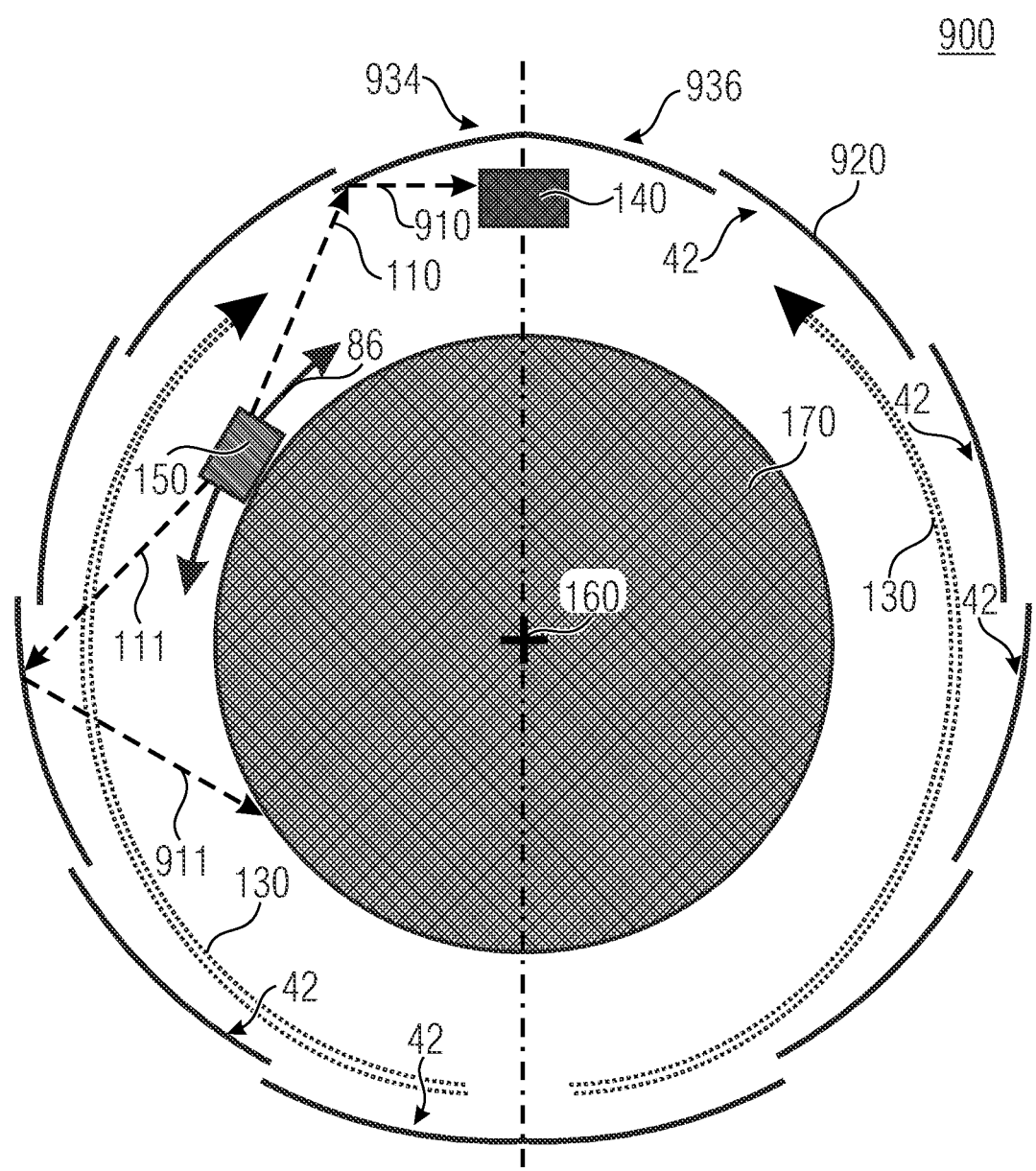
FIG. 9 is a top view of an optical device with mirror elements according to another example of the present disclosure.

FIG. 9 shows a schematic illustration of an optical device 900 according to an example of the present disclosure. In the optical device 900, the light path, as an alternative to optical fiber elements, is implemented with mirror elements 920 arranged tilted with respect to each other. The optical device 900 may correspond to the optical device 10. The first interfaces 42 may each be at least part of one of the mirror elements 920. In the optical device 900, the first interfaces 42 limit the light path 20 radially outward so that the light path runs within the mirror elements That is, in the optical device 900, the first interfaces 42 are configured as mirrors for the light of the light path 20 in order to reflect light incident on the respective first interface 42 from the light path. In the example shown in FIG. 9, the light path has first and second light path segments 934, 936 with opposite predetermined directions of travel. However, it is also possible to implement the optical device 900 with a single light path segment similar to the optical device 800.

In examples of the optical device 900, for the first interfaces 42 of a respective light path segment 30, the directions of travel from the first tangential end along the respective first interface to the second tangential end are opposite to the predetermined direction of travel for the respective light path element. Thus, a preferred direction for propagation of light along the predetermined direction of travel may result.

In examples, the optical device 900 comprises at least one transmitting unit 150, the at least one transmitting unit and the light path being arranged such that the at least one transmitting unit is rotatable relative to the light path on a circular path 86 concentric to the light path, wherein the radius of the concentric circular path is smaller than the radius of the circular path of the light path. The at least one transmitting unit configured to emit at least one light beam 110, 111, which signals a signal, in the direction of the circular path of the light path. The radiation direction of the at least one light beam is selected such that the at least one light beam couples into the light path upon reflection at one of the first interfaces 42 of one of the at least one light path segment.

FIG. 10 shows a sectional view of the optical device 900 along a plane along the circular axis 160. In the example of the optical device 900 shown in FIG. 10, the first interfaces along the axial direction of the circular arc are convex with respect to the center of the circle of the circular arc. The axial direction of the circular arc denotes a direction perpendicular to the circular plane of the circular arc.

In other words, the optical device 900 as shown in FIGS. 9 and 10 may be an alternative to the implementation of the inventive idea using optical fibers. In this case, instead of an optical medium, the light is directly guided in air and redirected by means of mirror elements. These mirror elements fulfill the function of the outer interface 190 and are arranged and shaped according to the same principle as the optical fiber elements 121. As shown in FIG. 900, a subdivision into several mirror elements 920 is suitable here, since this facilitates production. However, a connection to a large mirror is conceivable. The emitter(s) 150 is/are expediently arranged within the mirror elements, i.e. within the light path. The output beams 110, 111 are reflected inward by the mirror elements. This again results in a preferred direction 130, so that the reflected beam 910 is reflected radially outward and can thus be guided further and the beam 911 is reflected further in the direction of the axis of rotation against the preferred direction and thus collides with the free area in the interior 170 and is thus potentially lost.

For the alternative implementation with mirror elements, a variant with several transmitters as shown in FIG. 7 can also be applied as well as an arrangement without symmetry to the receiver as shown in FIG. 8.

Figure 11A:
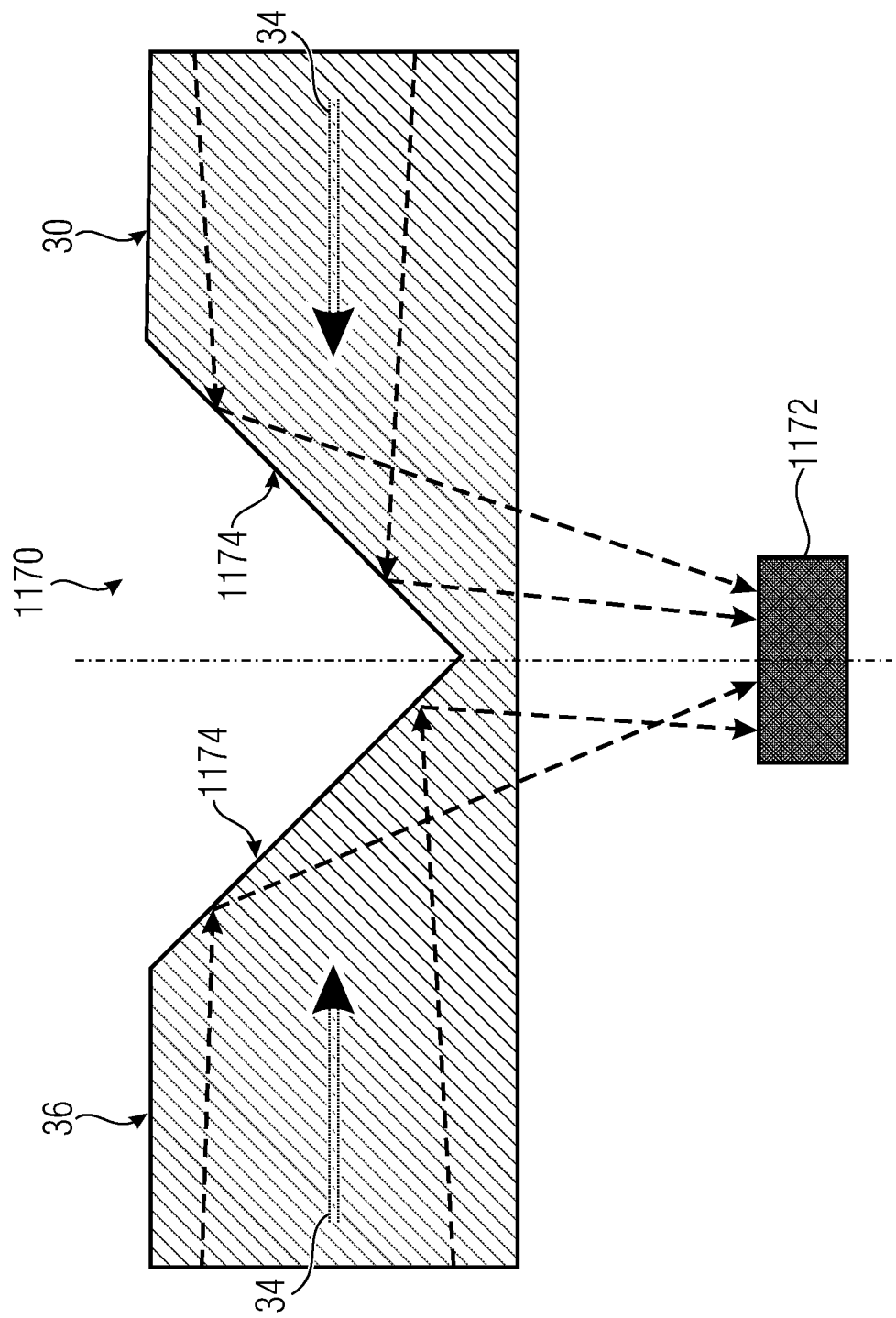
Figure 11B:
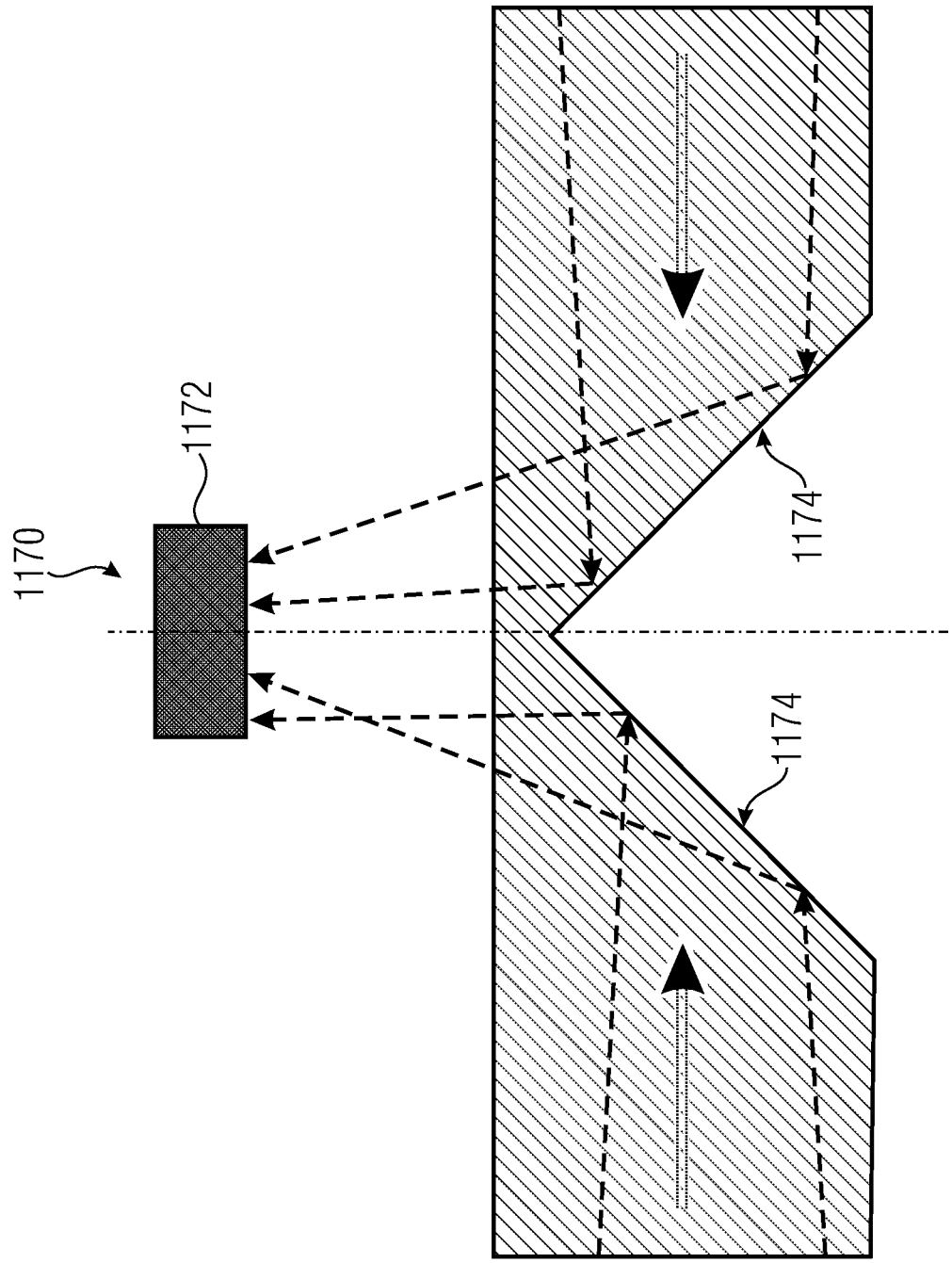
Figure 11C:
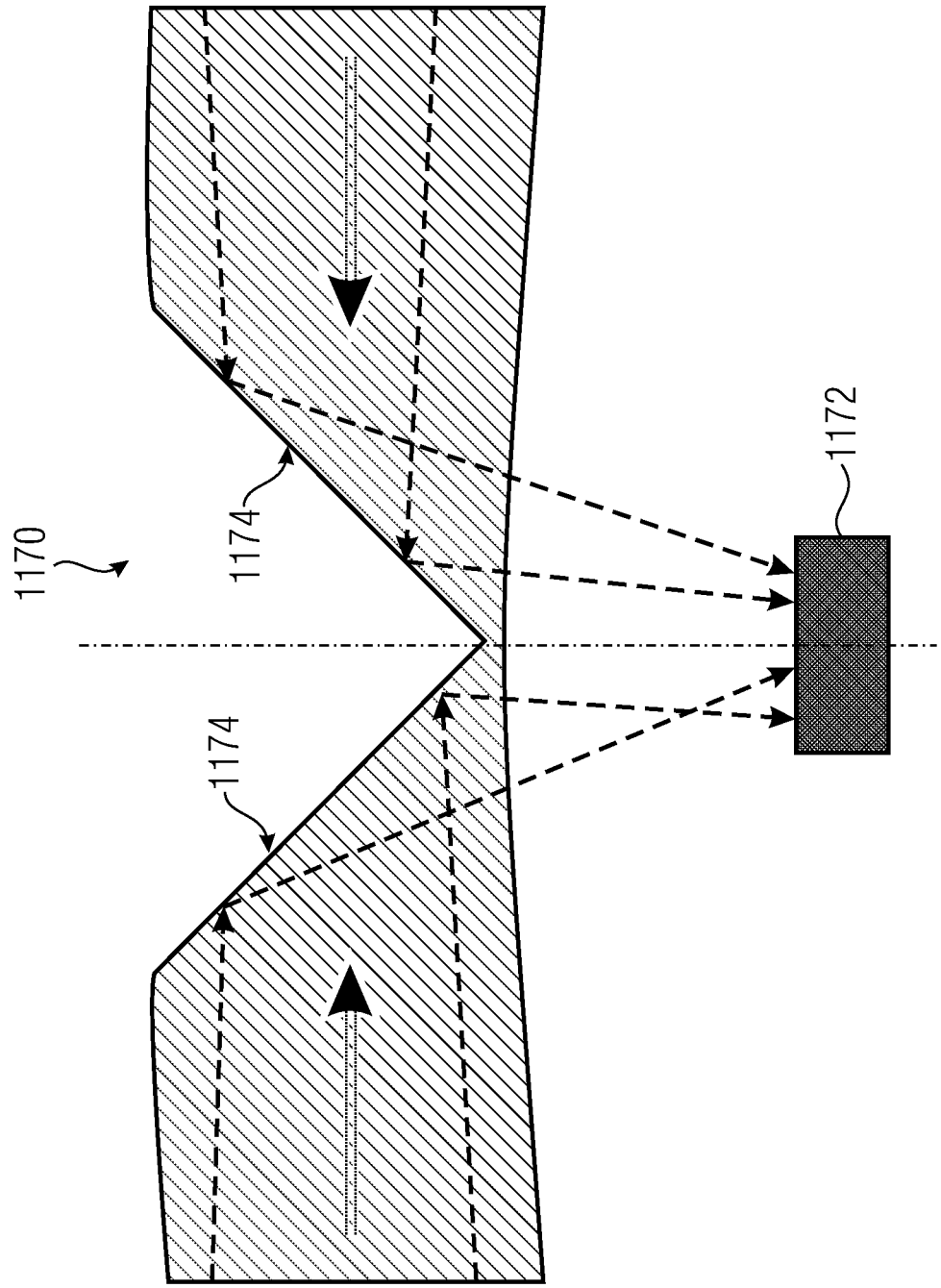

FIGS. 11A, 11B, 11C, 11D show schematic illustrations of examples of receiving means 1170 in accordance with examples of the present disclosure. The receiving means 1170 include examples of potential decoupling structures and arrangements of a receiver 1172, such as a detector. The receiving means 1170 may correspond to the receiving means 70, 140. The receiving means 1170 comprises a receiver 1172 and decoupling structure elements 1174, each configured to decouple light reaching the tangential end of a respective light path segment 30 from the light path. The decoupling may be in a first axial direction (FIG. 11A), or in a second axial direction (FIG. 11B). An axial direction is a direction perpendicular to the radial direction and the tangential direction, e.g., a direction perpendicular to the drawing plane of FIG. 13. Alternatively, decoupling can take place radially inward (FIG. 11C), outward (FIG. 11D). It is also possible to have decoupling directions, which have both a component in the axial direction and a component in the radial direction. The decoupling direction can also have a component in the tangential direction.

The following describes the wedge shape as it may be formed by the light path elements 121. Although the mutually inclined surfaces are shown opposite each other in the following, the description applies equivalently to examples in which the first and second interfaces are tangentially displaced with respect to each other.

Figure 12:
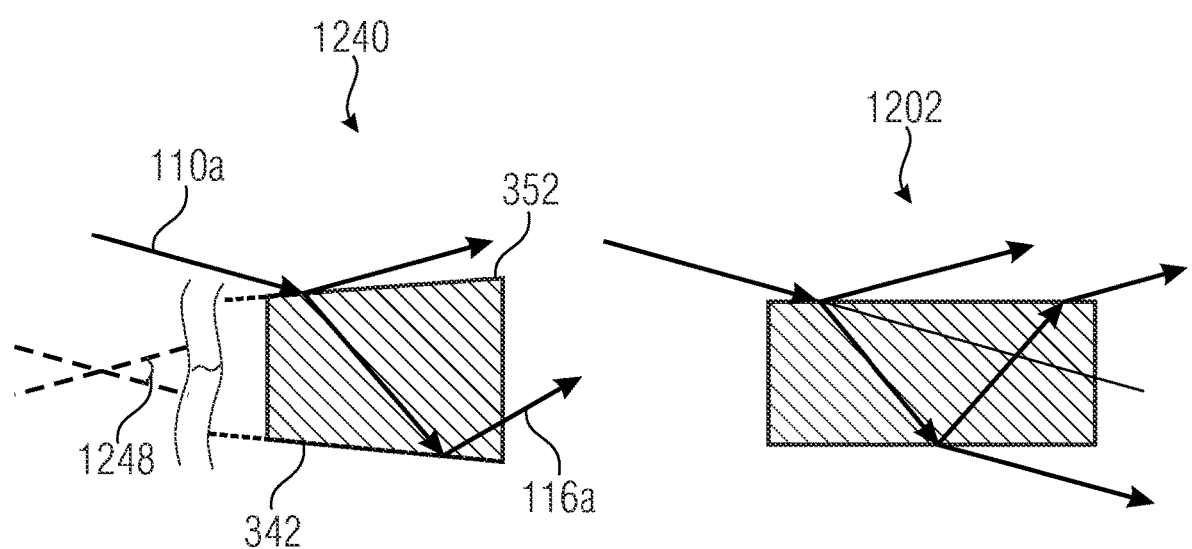
FIG. 12 is a schematic illustration of coupling a light beam into a wedge-shaped optical fiber element according to an example of the present disclosure.

FIG. 12 shows a schematic illustration of a coupling of a light beam into a wedge-shaped optical fiber element 1240 according to an example of the present disclosure. The optical fiber element 1240 is an example of the light path element 40, 121. On the right side, FIG. 12 shows a typical plane-parallel plate 1202 and how a light beam passes through the same. Thick lines represent incident beams, which carry most of the optical power.

Thin lines represent the Fresnel reflections. The input beam and the output beam are parallel to each other. Total reflection is not possible. Only a part of the optical power is briefly guided in the optical fiber.

To enable total reflection at the second interface, the two interfaces have to be tilted towards each other (form a wedge) until total reflection occurs. At the same time, the angle of incidence at the first interface has to be very shallow to prevent the wedge shape from becoming too extreme. On the other hand, the flatter the angle of incidence, the higher the Fresnel losses. In examples, depending on the refractive index of the chosen materials, above an angle of incidence of 70°, the fraction of Fresnel reflection can increase. In such cases, an angle of incidence of 70-75° can be considered as maximum. At the same time, an angle of incidence of 75° and a refractive index of 1.5 would need a wedge of about 2° to allow total reflection. If a steeper angle 1248 is chosen to reduce Fresnel losses further, this increases slightly. Accordingly, the wedge shape is advantageously <~6°. Parallel-polarized light further helps to keep the losses low or alternatively to make the wedge narrower.

Figure 17:
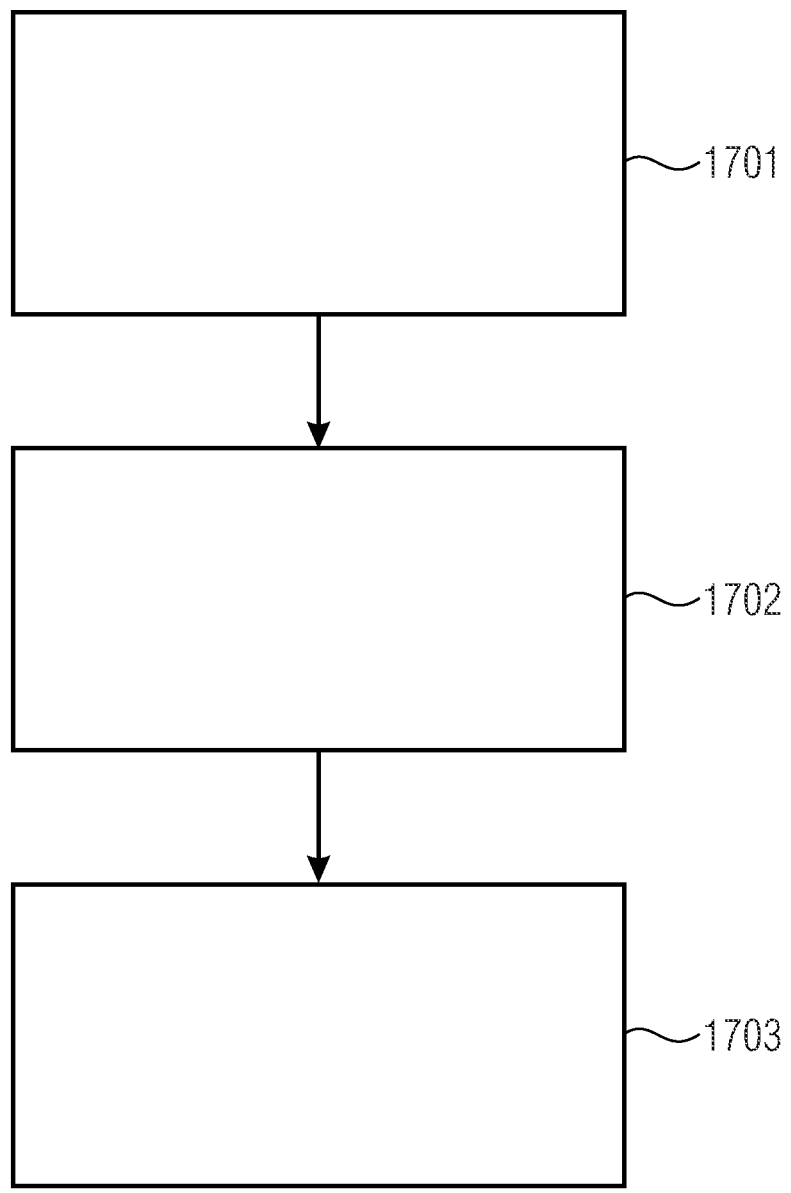
FIG. 17 is a flowchart of a method for transmitting a signal according to an example of the present disclosure.

FIG. 17 shows a flowchart of a method 1700 for transmitting a signal between two units rotating relative to each other using the optical device 10, 300, 400, 500, 600, 700, 800, 900, 1000 the method 1700 comprises the following steps: emitting 1701 at least one light beam signaling the signal; coupling 1702 at least one of the at least one light beams into one of the at least one light path segments, such that the coupled light beam propagates in the predetermined direction of travel of the light path segment; detecting 1703 the coupled light beam that has propagated in the predetermined direction of travel by means of receiving means stationary with respect to the light path.

Although some aspects of the present disclosure have been described as features related to a device, it is clear that such a description may also be considered as a description of corresponding method features. Although some aspects have been described as features related to a method, it is clear that such a description may also be considered as a description of corresponding features of a device or functionality of a device.

In the preceding detailed description, various features have been grouped together in examples in part to streamline the disclosure. This type of disclosure should not be interpreted as an intent that the claimed examples have more features than are explicitly stated in each claim. Rather, as the following claims show, the subject matter may be found in fewer than all of the features of a single disclosed example. Consequently, the following claims are hereby incorporated into the detailed description, and each claim may stand as its own separate example. While each claim may stand as its own separate example, it should be noted that although dependent claims in the claims relate to a specific combination with one or more other claims, other examples also include a combination of dependent claims with the subject matter of any other dependent claim or a combination of any feature with other dependent or independent claims. Such combinations are included unless it is stated that a specific combination is not intended. It is further intended that a combination of features of a claim with any other independent claim is also included, even if that claim is not directly dependent on the independent claim.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An optical device comprising a light path for guiding a light beam along a circular arc,
   wherein the light path comprises at least one light path segment comprising a plurality of light path elements arranged tangentially along the light path, each of the light path elements being at least partially limited in a radial direction by a respective first interface,
   wherein the first interfaces of a respective light path segment are each configured to reflect at least light incident from the light path at an angle of incidence greater than a predetermined angle onto the respective first interface to keep a light beam propagating along the light path in a direction of travel predetermined for the respective light path segment on the light path; and
   wherein, for each of the first interfaces of the plurality of light path elements, a first tangential end of the respective first interface is spaced radially further apart from the center of the circle of the circular arc than a second tangential end of the respective first interface, wherein a ratio between an extension of each of the first interfaces in a tangential direction along the circular arc and a distance between the first tangential end of a first one of the first interfaces and the second tangential end of a second one of the first interfaces neighboring the first tangential end of the first one of the first interfaces, the distance being measured in the tangential direction along the circular arc, is at least 5:1.

2. The optical device according to claim 1, wherein each of the first interface of a respective light path segment is configured such that, for each point of the first interface, a surface normal is rotated with respect to a connecting line between the respective point of the first interface and the center of the circle of the circular arc within the circular plane of the circular arc in a direction of rotation predetermined for the respective light path segment.

3. The optical device according to claim 1, wherein a respective intersection of the first interface in the circular plane of the circular arc is convex or planar with respect to the center of the circle.

4. The optical device according to claim 1, wherein an intersection of each of the first interface in the circular plane of the circular arc describes a respective interface circular arc.

5. The optical device according to claim 1,
wherein the at least one light path segment comprises at least a first light path segment and a second light path segment, and
wherein the respective directions of travel predetermined for the first light path segment and the second light path segment are opposite.

6. The optical device according to claim 1, further comprising a receiver arranged stationary with respect to the light path and configured to detect light passing through one of the at least one light path segments in the predetermined direction of travel of the respective light path segment.

7. The optical device according to claim 1,
wherein the first interface limits the light path radially outward, and
wherein the first interface is configured as mirrors for the light from the light path to reflect light incident from the light path onto the respective first interface.

8. The optical device according to claim 7, wherein the first interface are configured in a convex manner along the axial direction of the circular arc with respect to the center of the circle of the circular arc.

9. The optical device according to claim 1, wherein the light path elements are formed by one or several optical fibers,
wherein each of the light path elements is at least partially limited radially inward and outward by a respective different one of the first interface and a second interface,
wherein the second interface of the light path elements are each configured to reflect light incident from the light path at an angle of incidence greater than a critical angle of the respective second interface onto the respective second interface to keep a light beam propagating along the light path in a predetermined direction of travel for the respective light path segment on the light path, and
wherein the light path elements are wedge-shaped and have a greater expansion in the radial direction at a first tangential end than at a second tangential end.

10. The optical device according to claim 9,
wherein the first interfaces limit the light path segments radially outward, wherein the second interfaces limit the light path segments radially inward, and
wherein the second interface is configured in accordance with the first interface, wherein the first tangential end of the first interface of a respective light path element is opposite to the second tangential end of the second interface of the respective light path element in radial direction.

11. The optical device according to claim 9,
wherein the first interfaces limit the light path segments radially outward, wherein the second interface limits the light path segments radially inward, and
wherein for the first interface of a respective light path segment, the direction of travel from the first tangential end along the respective first interface to the second tangential end is opposite to the direction of travel predetermined for the respective light path segment, and for the second interface of a respective light path segment, the direction of travel from the first tangential end along the respective second interface to the second tangential end corresponds to the direction of travel predetermined for the respective light path segment.

12. The optical device according to claim 11, wherein the first interface and the second interface are arranged offset from each other in a direction tangential to the light path.

13. The optical device according to claim 9, wherein the second interface of a respective light path segment together form a circular arc around the center of the circle of the light path.

14. The optical device according to claim 9,
wherein the second interface limiting the light path elements radially outward are configured in a convex manner along the axial direction of the circular arc with respect to the center of the circle of the circular arc, and
wherein the second interface limiting the light path elements radially inward are configured in a concave manner along the axial direction of the circular arc with respect to the center of the circle of the circular arc.

15. The optical device according to claim 9,
wherein a wedge angle between a respective one of the first interface and one of the second interface is in a range between 1° and 10° or in a range between 2° and 6°,
wherein the wedge angle is the sum of a first angle of the respective first interface and a second angle of the respective second interface,
wherein the first angle is the smallest angle between the line connecting the first tangential end and the second tangential end of the respective first interface and the tangent to the circular arc of the light path at a point centered in tangential direction between the first tangential end and the second tangential end of the respective first interface, and
wherein the second angle is the smallest angle between the line connecting the first tangential end and the second tangential end of the respective second interface and the tangent to the circular arc of the light path at a point centered in tangential direction between the first tangential end and the second tangential end of the respective second interface.

16. The optical device according to claim 1, further comprising at least one transmitting unit,
wherein the at least one transmitting unit and the light path are arranged such that the at least one transmitting unit is rotatable relative to the light path on a circular path concentric to the light path, and
wherein the at least one transmitting unit is configured to emit at least one light beam, which signals a signal, in the direction of the circular path of the light path.

17. The optical device according to claim 7, further comprising at least one transmitting unit,
wherein the at least one transmitting unit and the light path are arranged such that the at least one transmitting unit is rotatable relative to the light path on a circular path concentric to the light path, wherein the radius of the concentric circular path is smaller than the radius of the circular arc of the light path,
wherein the at least one transmitting unit is configured to emit at least one light beam, which signals a signal, in the direction of the circular path of the light path, and
wherein the radiation direction of the at least one light beam is selected such that the at least one light beam is coupled into the light path upon reflection at one of the first interface of one of the at least one light path segment.

18. The optical device according to claim 9, further comprising at least one transmitting unit, wherein the at least one transmitting unit and the light path are arranged such that the at least one transmitting unit is rotatable relative to the light path along a circular path concentric to the light path, wherein the radius of the concentric circular path is smaller or larger than the radius of the circular arc of the light path, wherein the at least one transmitting unit is configured to emit at least one light beam, which signals a signal, in the direction of the circular path of the light path, and wherein the radiation direction of the at least one light beam is selected such that the at least one light beam is coupled into the light path by refraction when incident on one of the first interface or the second interface of one of the at least one light path segments.

19. The optical device according to claim 18, wherein the radiation direction of the at least one light beam is selected such that the angle of incidence of the at least one light beam when incident on one of the first interface or the second interface is less than 80°, or less than 75°, or is in a range between 60° and 80°, or in a range between 65° and °.

20. The optical device according to claim 1,
wherein the at least one light path segment comprises a first light path segment and a second light path segment,
wherein the optical device comprises at least one transmitting unit, the at least one transmitting unit and the light path being arranged such that the at least one transmitting unit is rotatable relative to the light path on a circular path concentric to the light path,
wherein the at least one transmitting unit is configured to emit a first light beam and a second light beam, in the direction of the circular path of the light path, and
wherein a tangential component of the directional vector of the first light beam points in the predetermined direction of travel of the first light path segment, and a tangential component of the directional vector of the second light beam points in the predetermined direction of travel of the second light path segment.

21. The optical device according to claim 15,
wherein the light path comprises an n-th fraction of an entire circle, and
wherein the at least one transmitting unit comprises a number of n transmitting units that are equally distributed along the concentric circular path.

22. A method for transmitting a signal between two units rotating relative to each other using the optical device according to claim 1, comprising:
emitting at least one light beam, which signals the signal,
coupling at least one of the at least one light beams into one of the at least one light path segments such that the coupled light beam propagates in the predetermined direction of travel of the light path segment, and
detecting the coupled-in light beam that has propagated in the predetermined direction of travel by means of a receiver arranged stationary with respect to the light path.

* * * * *

UNITED STATES PATENT AND TRADEMARK OFFICE
CERTIFICATE OF CORRECTION

PATENT NO. : 11,899,252 B2
APPLICATION NO. : 17/392948
DATED : February 13, 2024
INVENTOR(S) : Tobias Schneider It is certified that error appears in the above-identified patent and that said Letters Patent is hereby corrected as shown below:

In the Claims

Column 27, Lines 15~20:
19. The optical device according to claim 18, wherein the radiation direction of the at least one light beam is selected such that the angle of incidence of the at least one light beam when incident on one of the first interface or the second interface is less than 80°, or less than 75°, or is in a range between 60° and 80°, or in a range between 65° and °.

Should read:
19. The optical device according to claim 18, wherein the radiation direction of the at least one light beam is selected such that the angle of incidence of the at least one light beam when incident on one of the first interface or the second interface is less than 80°, or less than 75°, or is in a range between 60° and 80°, or in a range between 65° and 75°.

Signed and Sealed this
Second Day of July, 2024

Katherine Kelly Vidal
*Director of the United States Patent and Trademark Office*